US010624520B2

(12) United States Patent
Thibault et al.

(10) Patent No.: US 10,624,520 B2
(45) Date of Patent: Apr. 21, 2020

(54) PAN CLEANER SYSTEM AND METHOD

(71) Applicant: AMF Automation Technologies Company of Canada, Sherbrooke, Quebec (CA)

(72) Inventors: Marc-Olivier Thibault, Sherbrooke (CA); David Frechette, Sherbrooke (CA); Michael Fortier, Sherbrooke (CA); Bobby Martin, Sherbrooke (CA); Charles Perreault, Sherbrooke (CA)

(73) Assignee: AMF Automation Technologies Company of Canada, Sherbrooke (CA)

( * ) Notice: Subject to any disclaimer, the term of this patent is extended or adjusted under 35 U.S.C. 154(b) by 0 days.

(21) Appl. No.: 16/144,473

(22) Filed: Sep. 27, 2018

(65) Prior Publication Data

US 2019/0090718 A1    Mar. 28, 2019

Related U.S. Application Data

(60) Provisional application No. 62/563,940, filed on Sep. 27, 2017.

(51) Int. Cl.
| | |
|---|---|
| *B65G 47/22* | (2006.01) |
| *B65G 17/46* | (2006.01) |
| *A47L 15/00* | (2006.01) |
| *B65G 47/252* | (2006.01) |
| *B08B 13/00* | (2006.01) |
| *B08B 1/02* | (2006.01) |

(Continued)

(52) U.S. Cl.
CPC ....... *A47L 15/0076* (2013.01); *A47L 15/0007* (2013.01); *B08B 13/00* (2013.01); *B65G 47/252* (2013.01); *B08B 1/02* (2013.01); *B08B 3/022* (2013.01); *B08B 5/023* (2013.01); *B65G 17/46* (2013.01)

(58) Field of Classification Search
None
See application file for complete search history.

(56) References Cited

U.S. PATENT DOCUMENTS

| | | | | |
|---|---|---|---|---|
| 5,988,351 | A | * | 11/1999 | Warkentin ........... B65G 47/248 198/370.01 |
| 6,250,871 | B1 | * | 6/2001 | LeCrone .................. A21B 3/18 414/384 |

(Continued)

*Primary Examiner* — Kavel Singh
(74) *Attorney, Agent, or Firm* — Brouillette Legal Inc.; Robert Brouillette

(57) ABSTRACT

The present invention relates to a pan cleaner system. The pan cleaner system comprises a main frame adapted to house a supply system, an inverting system and a cleaning system. The supply system, the inverting system and the cleaning system are configured to form a synchronized continuous functional line beginning by the supply system receiving a pan to be cleaned and ending by the cleaning system releasing a clean pan. The supply system comprises a first conveyor adapted to guide the pans towards the inverting and the cleaning systems. In one embodiment, the inverting system comprises a second conveyor adapted to magnetically hold the pans during the transport and the cleaning process. The pan cleaner system further comprises a releasing system adapted to release the pans from the magnetic conveyor once the cleaning process has been completed.

23 Claims, 22 Drawing Sheets

(51) Int. Cl.
B08B 5/02 (2006.01)
B08B 3/02 (2006.01)

(56) References Cited

U.S. PATENT DOCUMENTS

| | | | | |
|---|---|---|---|---|
| 7,032,737 B2* | 4/2006 | Egger | ............... | B65G 15/14 |
| | | | | 134/127 |
| 8,056,699 B2* | 11/2011 | Depot | ............... | A21B 3/16 |
| | | | | 134/153 |
| 8,181,767 B2* | 5/2012 | Gales | ............... | A21C 9/08 |
| | | | | 198/404 |
| 2009/0014279 A1* | 1/2009 | Bouetard | ............... | B65G 15/00 |
| | | | | 198/358 |
| 2015/0148161 A1* | 5/2015 | Gajewski | ............... | F01L 1/02 |
| | | | | 474/141 |

* cited by examiner

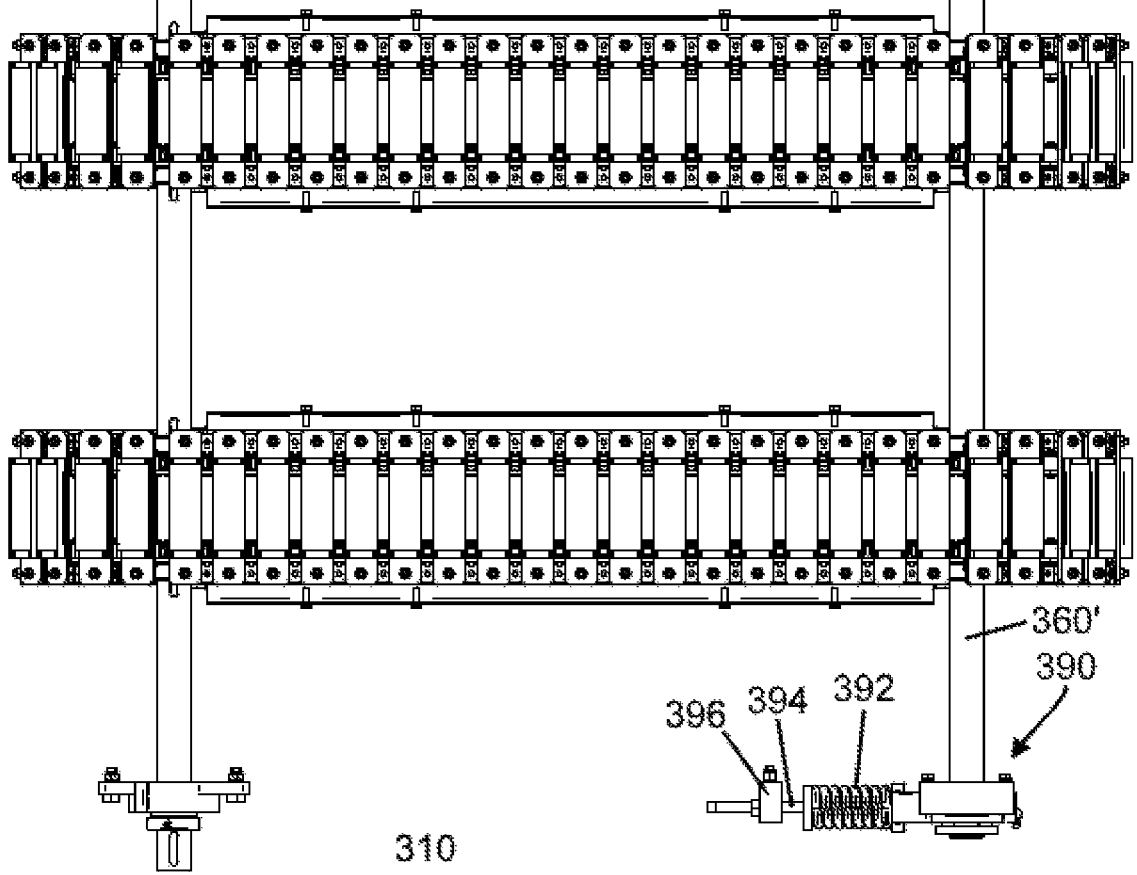
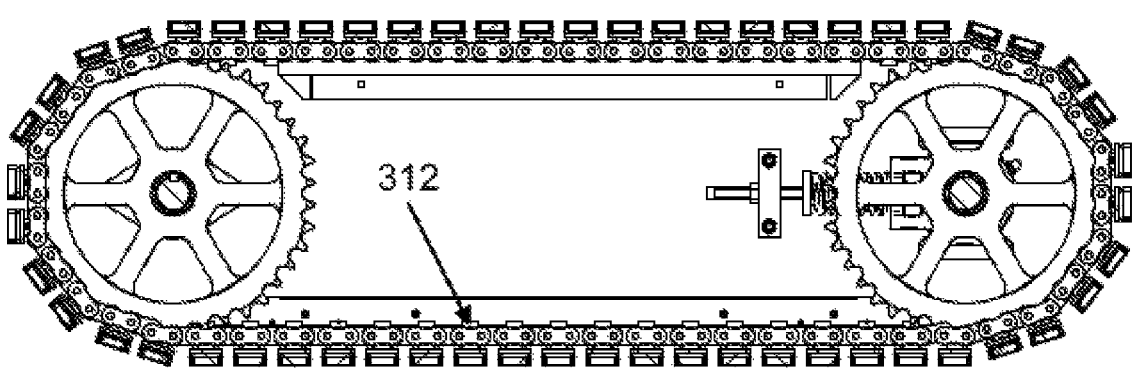

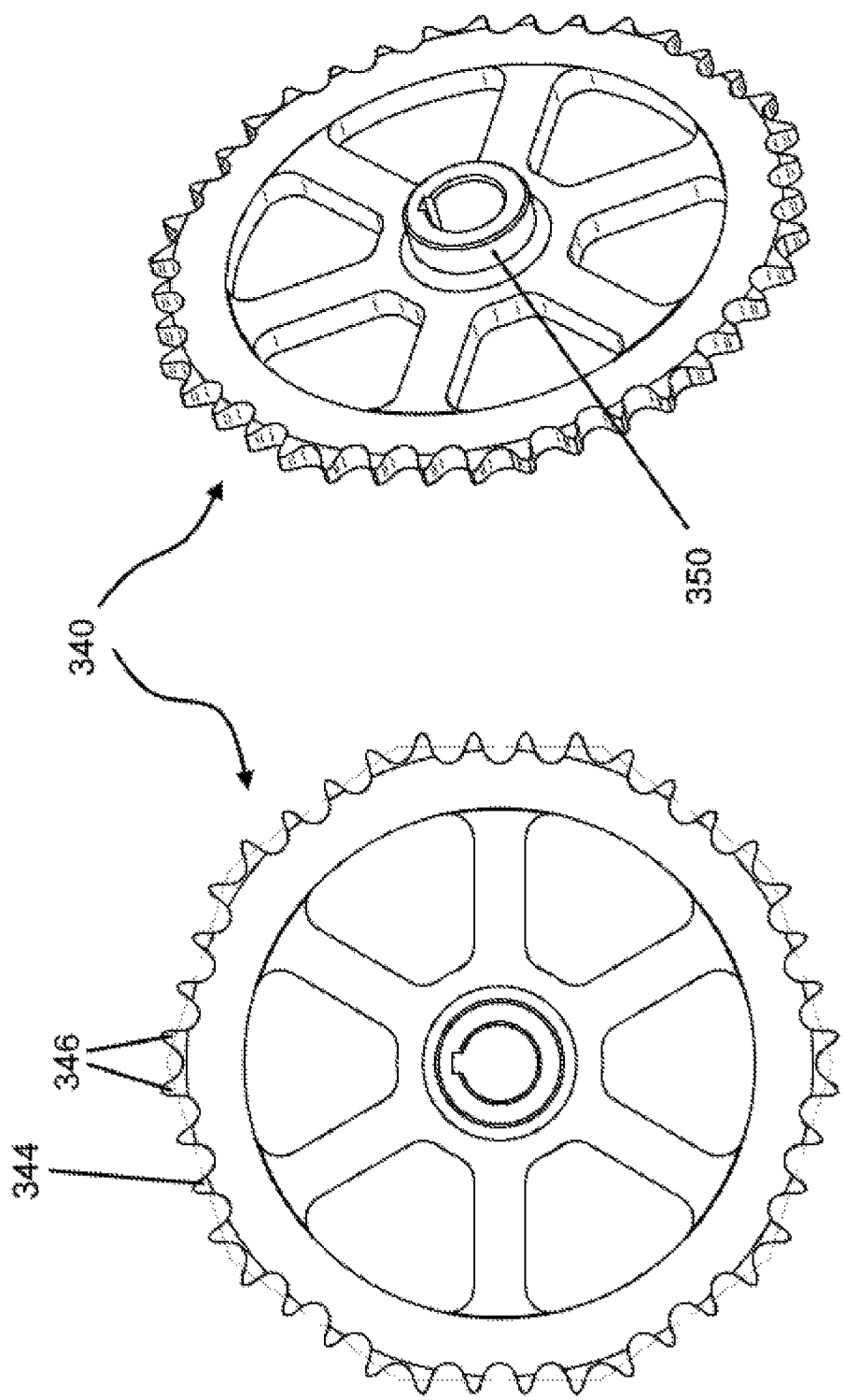

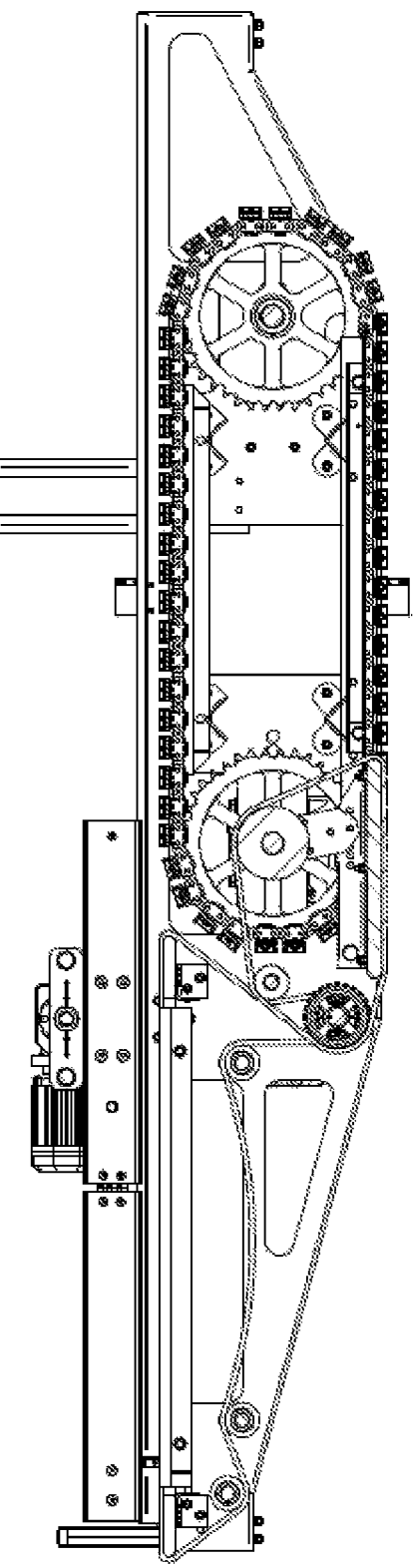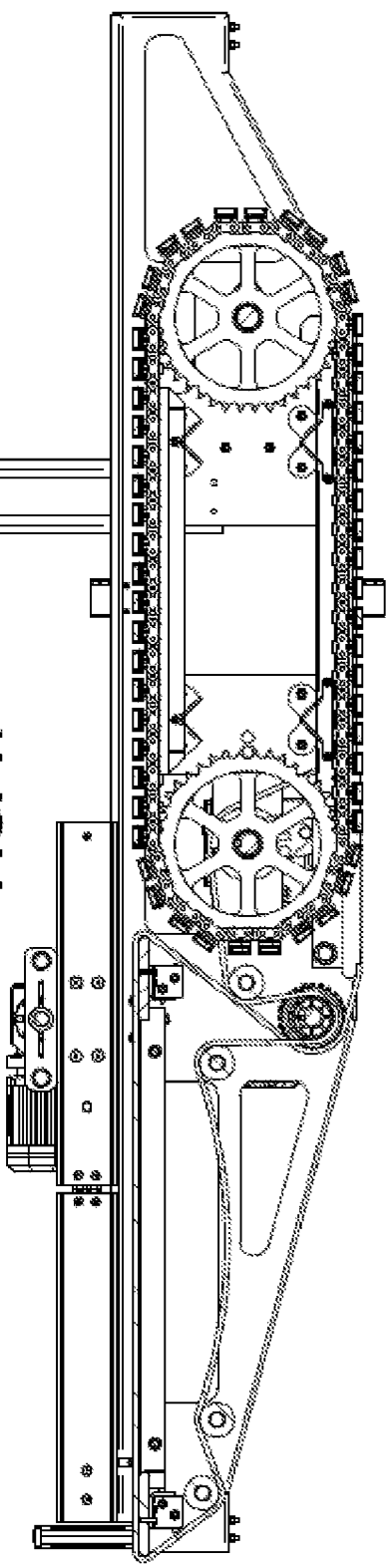

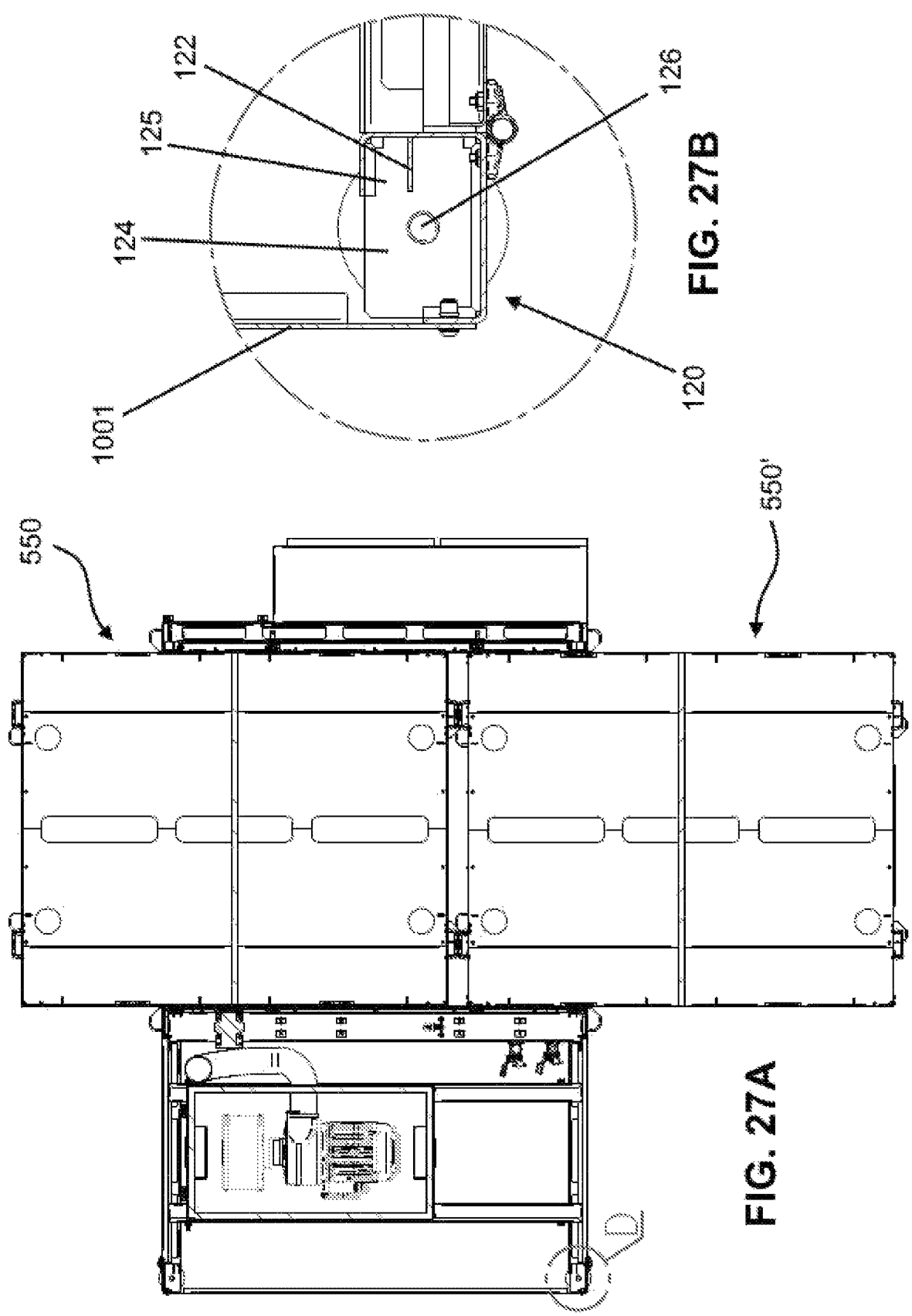

PAN CLEANER SYSTEM AND METHOD

CROSS-REFERENCE TO RELATED APPLICATIONS

The present patent application claims the benefits of priority of U.S. Provisional Patent Application No. 62/563,940, entitled "Pan Cleaner System and Method", and filed at the United States Patent and Trademark Office on Sep. 27, 2017, the content of which is incorporated herein by reference.

FIELD OF THE INVENTION

The present invention generally relates to an apparatus, system and method for cleaning food and bakery equipment, and more particularly to a pan cleaner inverter system and method.

BACKGROUND OF THE INVENTION

Various systems and methods to clean cooking equipment, such as baking pans and bakery equipment, are known in the art. The cleaning process generally requires precision to clean the pans quickly in order to minimize disruption of the production line. Many conventional pan cleaning systems, such as the pan cleaner disclosed in U.S. Pat. No. 8,056,699 B2, use conveyors to move the pans to a cleaning station and to a storing area. However, such conventional systems typically require the conveyor to be stopped for predetermined durations of time to ensure proper cleaning of the baking equipment. Such systems and methods generally focus on either cleaning speed or cleaning quality, but not both.

Pan inverting systems have been developed in the past, such as the pan inverting apparatus disclosed in U.S. Pat. No. 4,232,777. Generally, such pan inverting apparatus loads the pans, stops the production line, turns the pans upside down and moves the pan upside down to a storing space. Such pan inverting apparatus is limited by the inversion of pans and does not allow for an automated and continuous cleaning process. In addition, apparatuses of this type present a risk of breaking, losing or improperly turning pans upside during the flipping process.

Accordingly, there is a need for an improved process of cleaning pans and to provide a continuous automated pan cleaner system and process requiring no metering conveyor.

SUMMARY OF THE INVENTION

The shortcomings of the prior art are generally overcome by providing a pan cleaner inverter system and method allowing automatic transport and cleaning of pans.

The pan cleaner inverter system according to the present invention aims to reduce the cleaning time of pans by providing a synchronized continuous transport, cleaning and releasing process. The system aims to shorten delays caused by the flipping process of the pans during the cleaning operations.

In another aspect of the invention, the pan cleaner inverter system according to the present invention aims at improving the cleaning process of pans by limiting the risk of breaking, losing or improperly turning pans upside down.

In another aspect of the invention, the pan cleaner inverter system aims at providing a simple and safe pan inverting apparatus and avoiding use of complex preprogrammed timed systems like accumulation and/or metering conveyors.

Other and further aspects and advantages of the present invention will be obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

The above and other aspects, features and advantages of the invention will become more readily apparent from the following description, reference being made to the accompanying drawings in which:

FIG. 7 is a top view of the conveyor of the inverting system of FIG. 6.

FIG. 8 is a side view of the conveyor of the inverting system of FIG. 6.

FIG. 9 is a front view of an exemplary sprocket wheel used with an inverting system in accordance with the principles of the present invention.

FIG. 10 is a perspective view of the sprocket wheel of FIG. 9.

FIG. 16 is a sectional side view of the pan cleaner system of FIG. 13.

FIG. 17 is a side view of the pan cleaner system of FIG. 13.

FIG. 27A is a top sectional view of the inverting system of FIG. 25 shown with a trash bin being replaced.

FIG. 27B is a close-up side view of the D area of FIG. 27A showing cables being fit in the frame of the system.

DETAILED DESCRIPTION

Figure 1:
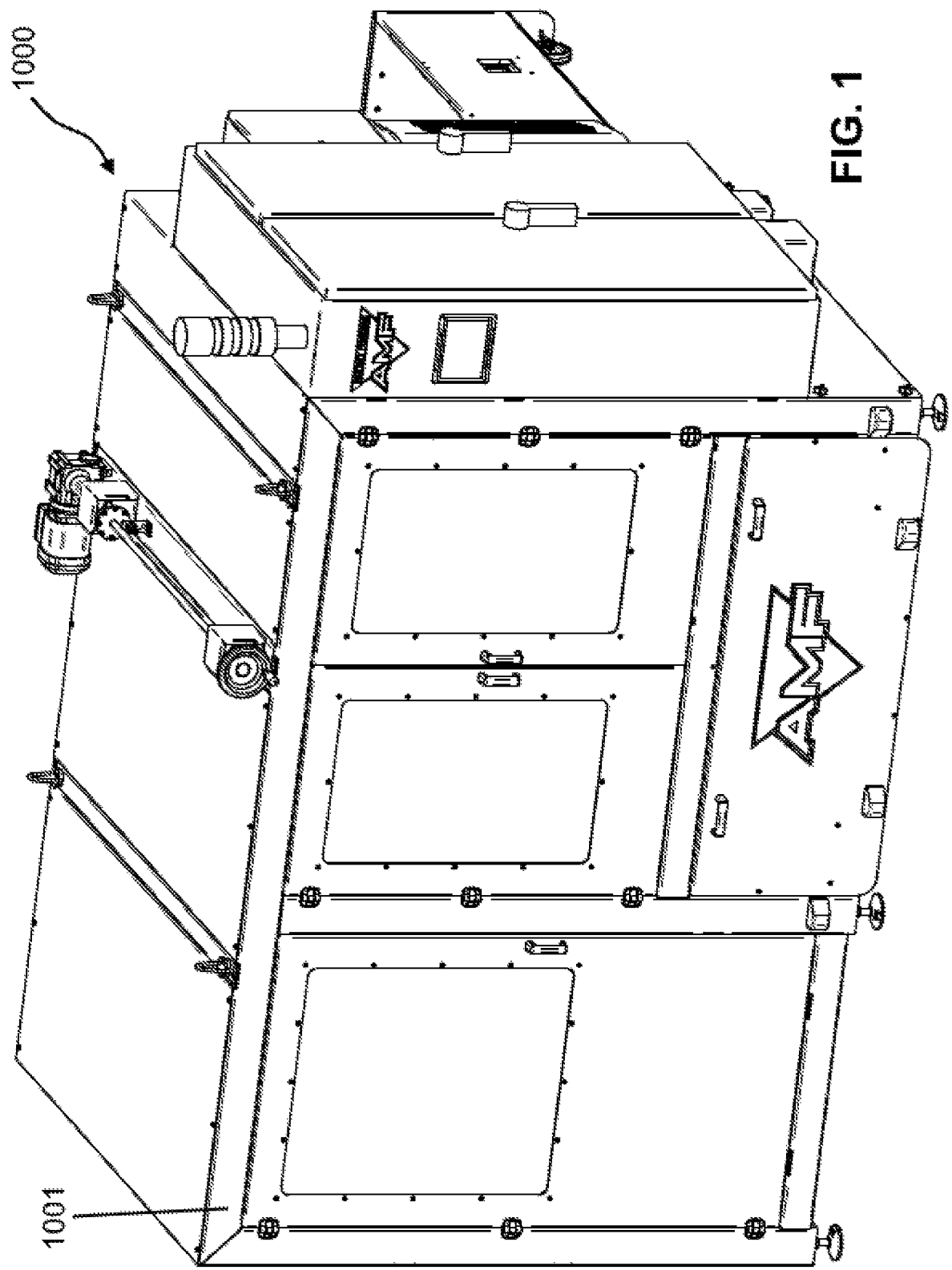
FIG. 1 is a perspective view of an embodiment of a pan cleaner inverter system being in a closed position in accordance with the principles of the present invention.
Figure 2:
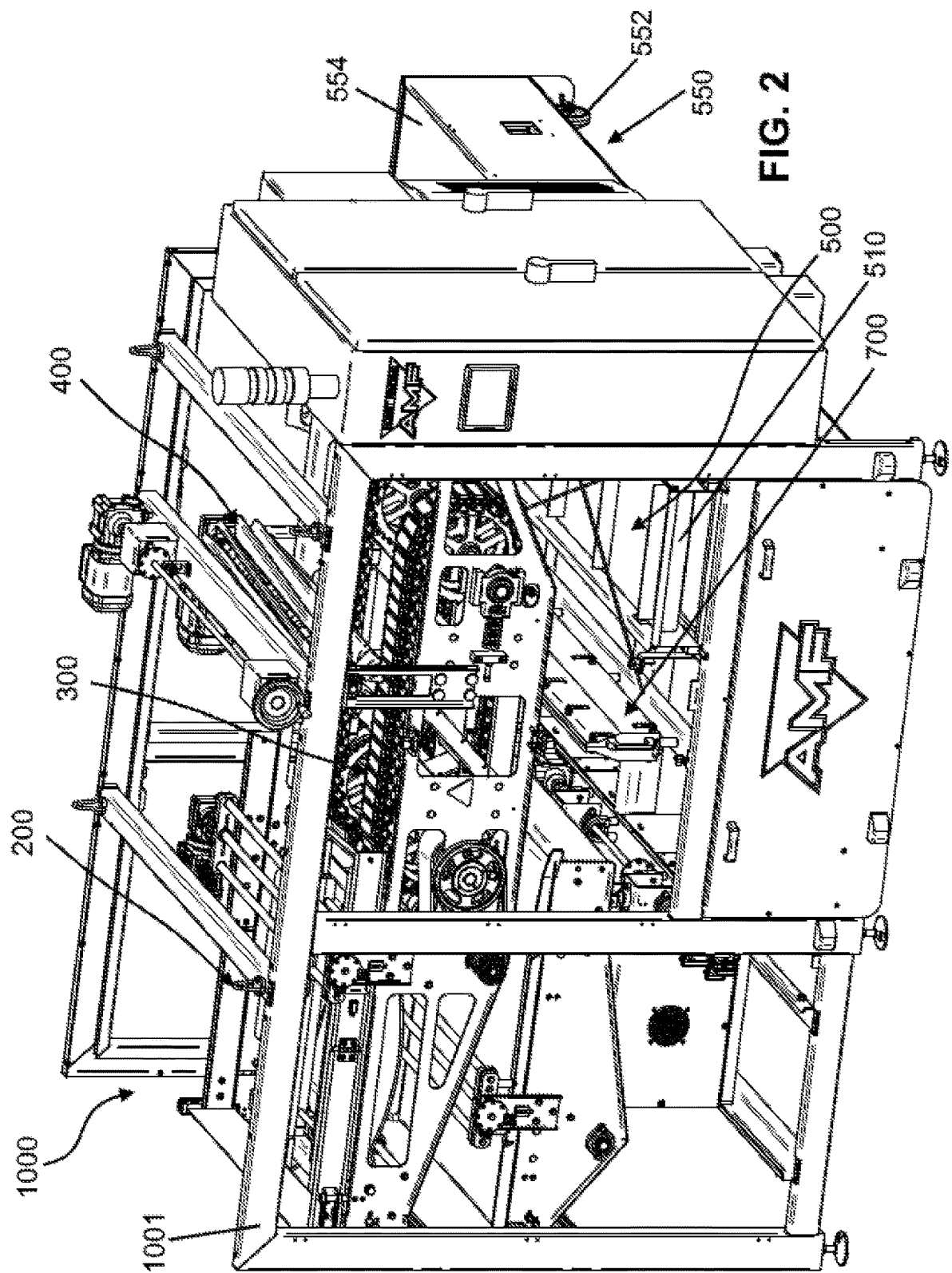
FIG. 2 is a perspective view of the pan cleaner inverter system being in an open position in accordance with the principles of the present invention.
Figure 3:
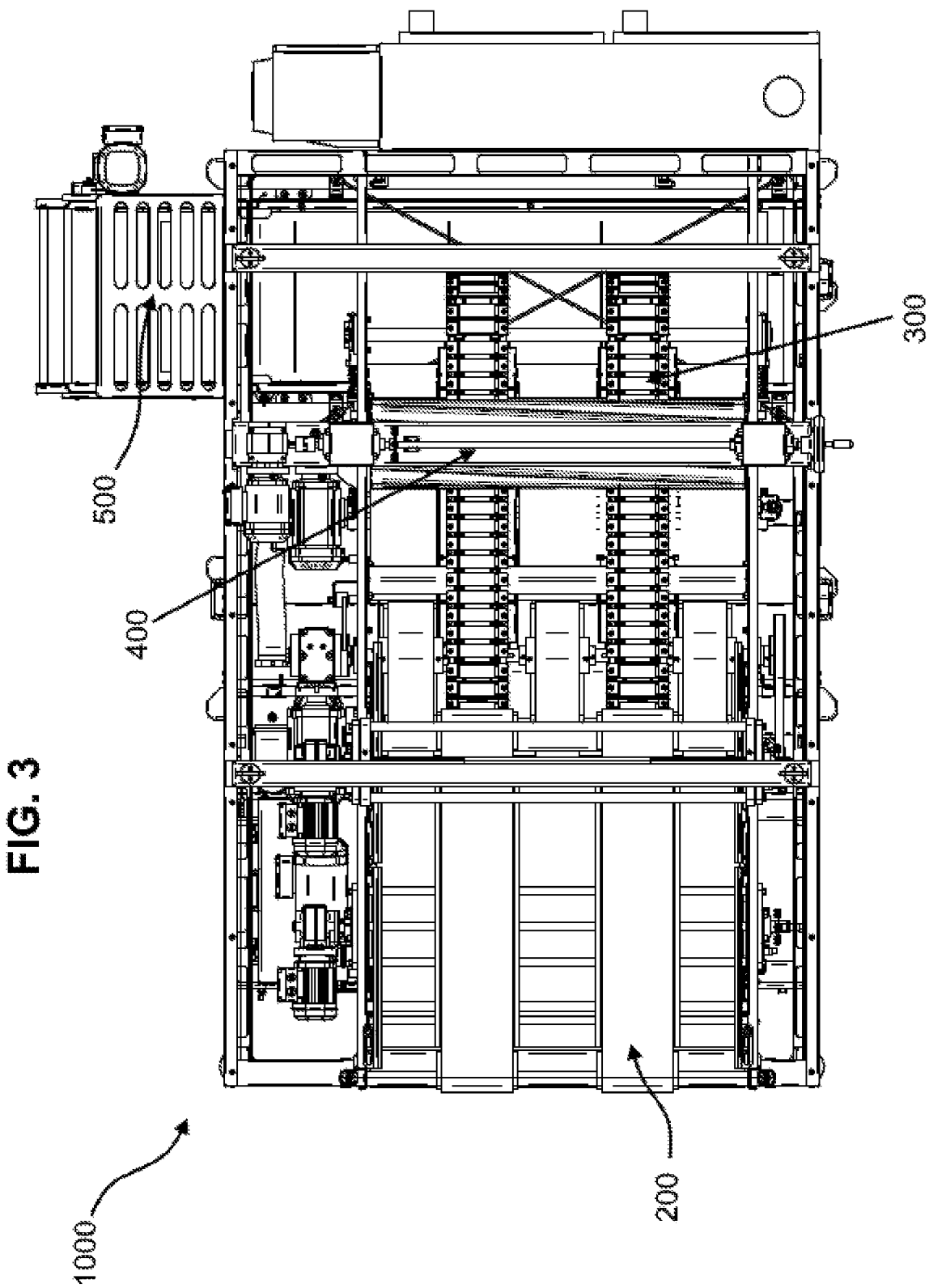
FIG. 3 is a top view of the pan cleaner inverter system in accordance with the principles of the present invention.

A novel pan cleaner system and method for cleaning pan will be described hereinafter. Although the invention is described in terms of specific illustrative embodiments, it is to be understood that the embodiments described herein are by way of example only and that the scope of the invention is not intended to be limited thereby.

A system and method to invert and clean pan is disclosed. The system to clean pans or baking equipment may be connected to any conveyor equipment that is used to move pans or other equipment to be cleaned. Understandably, other types of equipment or objects may be cleaned or inverted using the present invention.

Referring to FIGS. 1 to 4, an embodiment of a pan cleaner inverter system 1000 is illustrated. The pan cleaner system 1000 comprises a frame 1001 adapted to receive a supplying system 200 and a conveying and inverting assembly 300. Broadly, the system 1000 is adapted to receive the pan to be cleaned through the supplying system 200, to move the pan toward the inverting assembly 300 where the pan is inverted. When inverted, any loose element contained in the pan falls underneath.

In some embodiments, the system 1000 may further comprise a brushing system 400 adapted to brush the pan prior or during inversion. The system 1000 may further comprises a trash rejection system 500 adapted to receive the content to be discarded from the pan. Also, the system may comprise an air cleaning system 700 adapted to push air on the pan to dislodge any content stuck on the pan.

Understandably, each of the air cleaning system 700, the brush cleaning system 400 and the trash rejection system 1000 allow cleaning the pans while moving along the inverting assembly 300.

Figure 4:
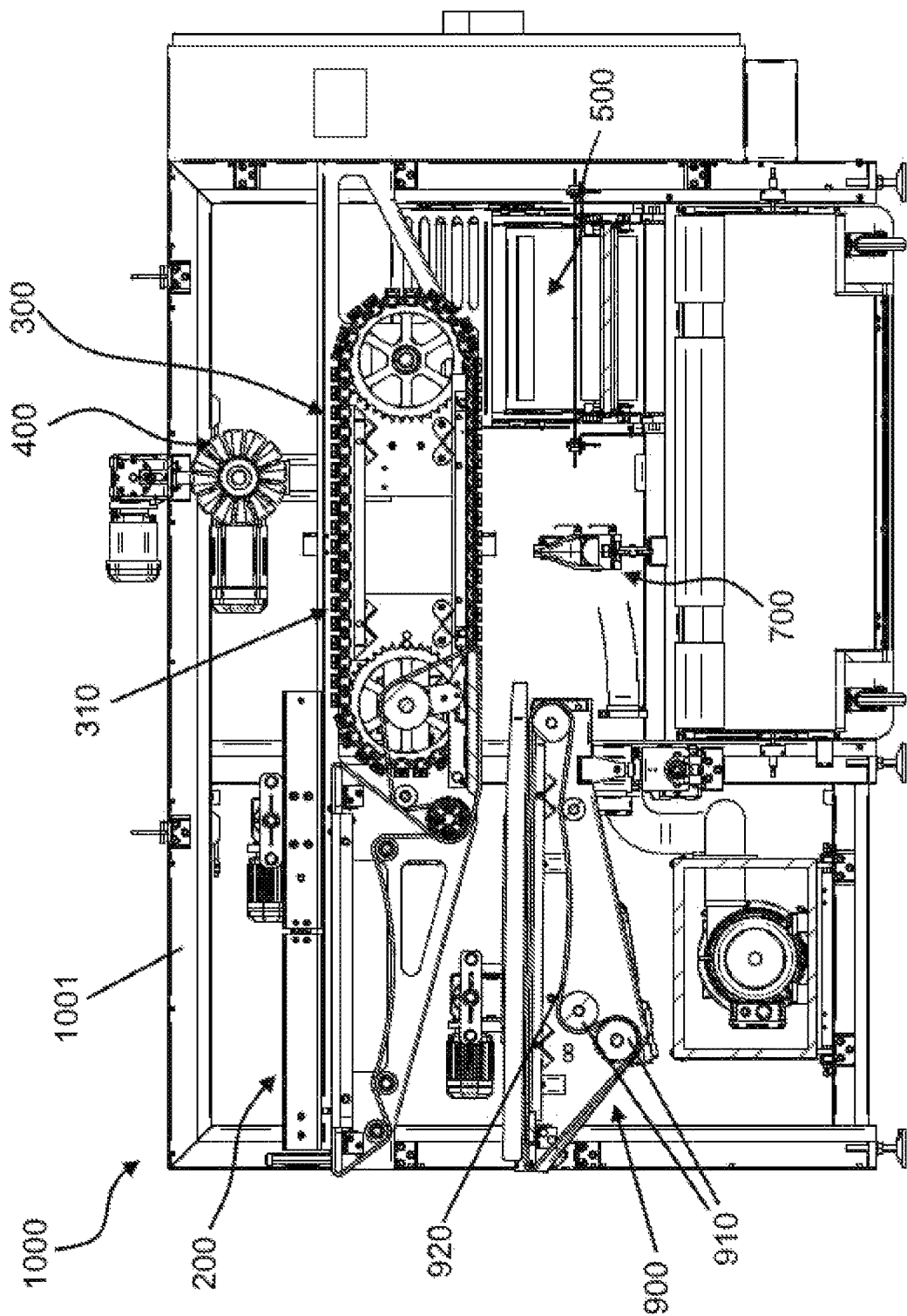
FIG. 4 is a sectional side view of the pan cleaner inverter system in accordance with principles of the present invention.

Referring now to FIG. 4, the pans are typically introduced to the system 1000 by a supply system 200. The pans are then directed towards an inverting system 300. The pans adhere to the inverting system 300 and while moving, the pans are inverted. While moving and being inverted by the inverting system 300, the pan remains attached or is adhered to the said inverting system 300.

Referring now to FIGS. 5 to 8, an embodiment of the inverting system 300 is illustrated. The inverting system 300 comprises at least one drive wheel 340, at least one idling wheel 340' surrounded by an endless belt 320. In the present embodiment, the idler wheel 340' is pivotably mounted to the frame 1001 of the system 1000 through a shaft 360'. And the driving wheel 340 is pivotally mounted to the frame 1001 through another shaft 360. Understandably, any other known mechanism of pivotally mounting the idling 340' or driving 340 wheels may be used without departing from the scope of the present invention. The at least one belt 320 is adapted to attach yet detach pans or equipment being over or under the said belt 320.

In the embodiment shown in FIGS. 5 to 8, the belt 320 typically comprises magnets 322 (also referred as a magnetic belt) solidly attached to a supporting element or frame 324. The magnets 322 are typically evenly positioned along the belt 320. In the present embodiment, each magnet 322 is attached to a plate 326 and each plate 326 is attached to the supporting element 324. The supporting element 324 may be any mechanism adapted be moved by the wheels 340 and 340' such as a chain or rubber band comprising sprocket teeth engaging sections.

In some embodiments, the inverting system 300 may comprise more than one belt 320 each driven by at least a pair of idling and driving wheels 340' and 340. In yet other embodiments, the belt 320 may have an increased width and may comprise two or more rows of magnets 322.

The belt 320 may further be configured to engage the first and second pair of the drive wheel 340 and idler wheel 340' and to freely slide over a sliding means 380.

In order to adhere to the magnetic belt 320, the baking equipment or pans is made of magnetic material, such as ferromagnetic material, iron, nickel, magnetite or any alloy containing magnetic metal.

In a preferred embodiment, when the pan rotates around a sprocket 340 or 340', two magnetic sections 322 typically provide magnetic forces to hold the pan attached to the magnetic belt 320.

Figure 5:
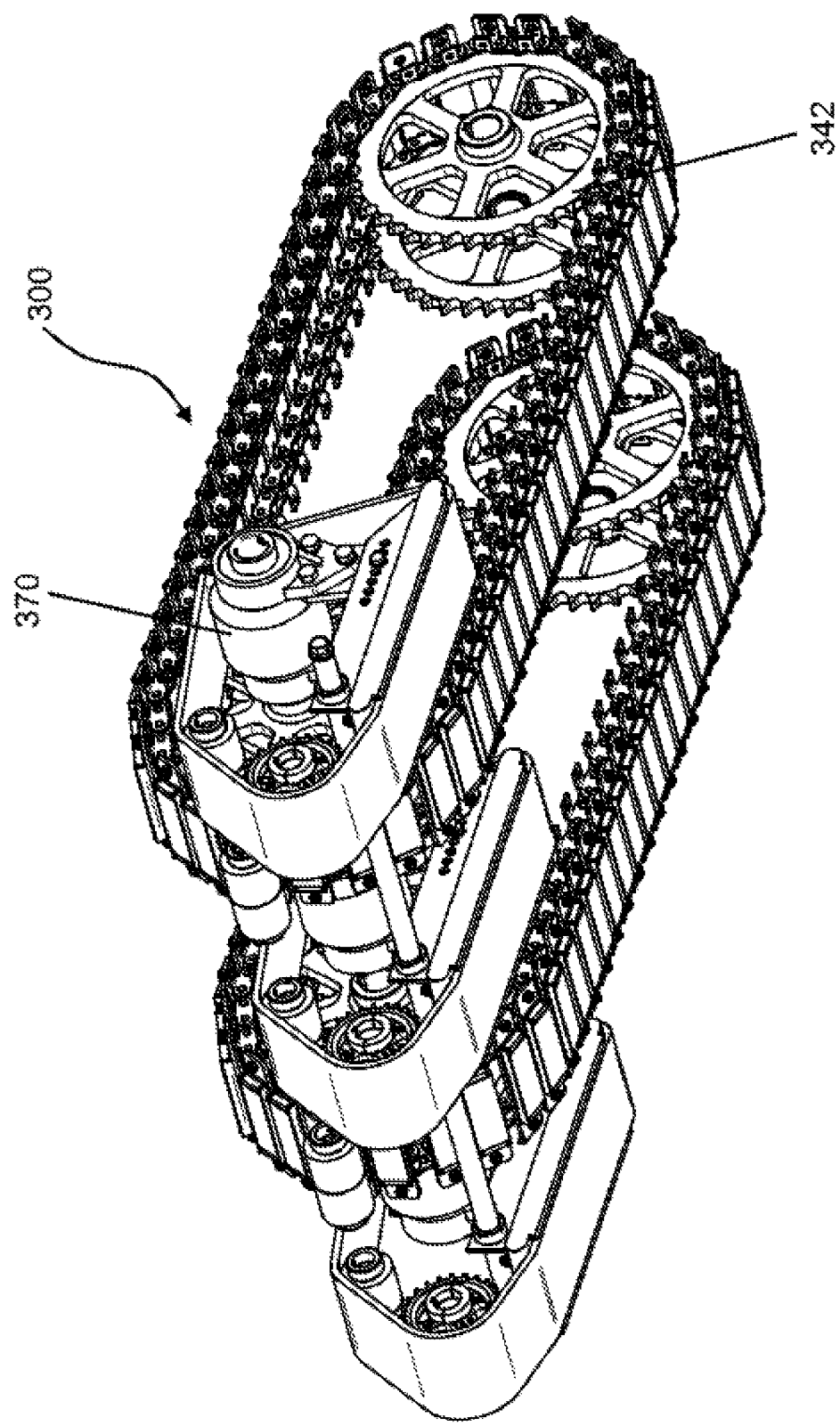
FIG. 5 is a bottom perspective view of an inverting system of a pan clean system in accordance with the principles of the present invention.
Figure 6:
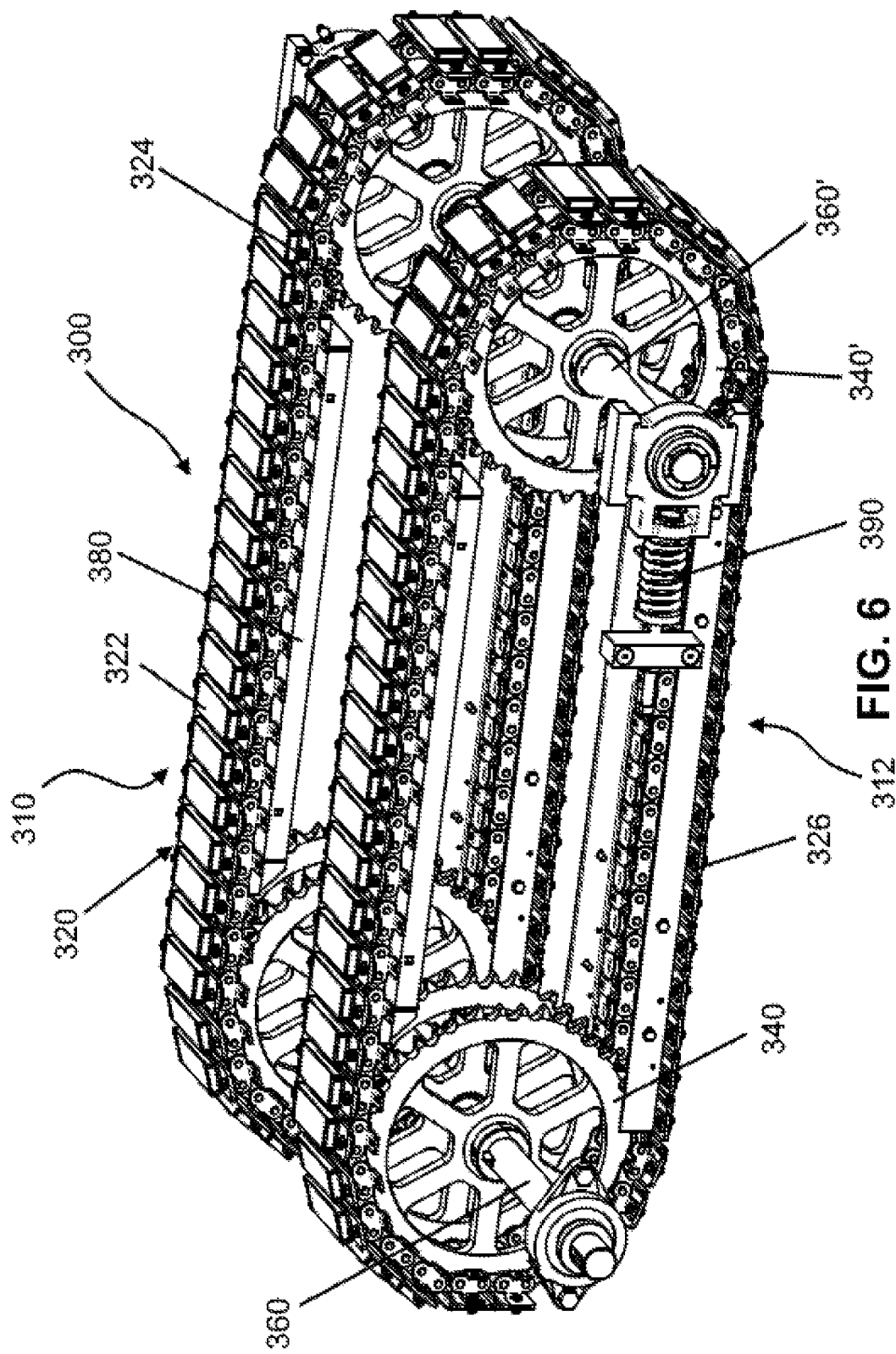
FIG. 6 is a partial top perspective view of the conveyor of the inverting system of FIG. 5.
Figure 11:
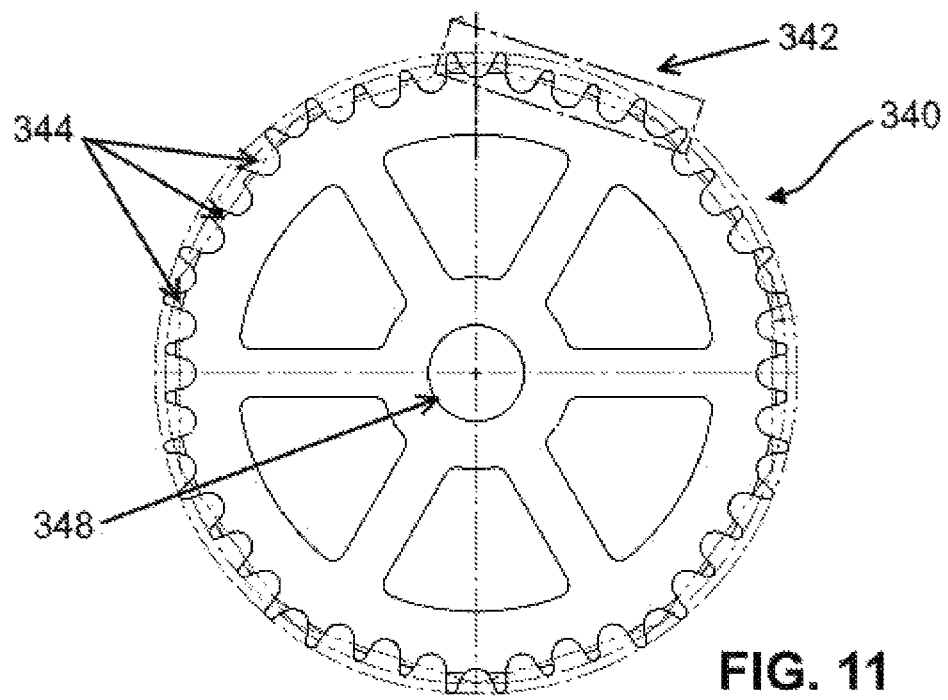
FIG. 11 is a front view of an exemplary sprocket wheel used with an inverting system in accordance with the principles of the present invention showing at least one flat section.

The shaft 360 is typically driven or powered by a motor 800 such as an electric motor or gear motor (see FIG. 5).

The inverter system 300 may further comprise a system for allowing variation of the tension 390 of the belt 320. As the drive wheel 340 and idling wheel 340' are not round, the tension in the belt 320 varies. The tension take-up system 390 typically comprises a coil or spring 392 over an elongated member 394. The elongated member is attached at one end to the shaft 360 or 360' and is slidably attached to the anchor 396 at the other end. Thus, the shaft 360' may slightly move to absorb tension variation of the belt 320. Understandably, any other mechanism to absorb variation of tension in the belt 320 may be used within the scope of the present invention.

In the present embodiment, the driving 340 and idling 340' wheels are sprocket wheels.

Now referring to FIGS. 18, 19 and 20A to 20D, another embodiment of an inverter system 1300 is illustrated. The inverter system 1300 comprises an endless magnetic belt 1320. The endless belt 1320 surrounds a pair of drive wheel 1340, a pair of idling wheels 1340'. The wheels 1340, 1340' drive the endless belt 1320. In the present embodiment, the idler wheel 1340' is pivotably mounted to the frame 1001 of the system 1000 through a shaft 1360'. And the driving wheel 1340 is pivotally mounted to the frame 1001 through another shaft 1360. Understandably, any other known mechanism of pivotally mounting the idling 1340' or driving 1340 wheels may be used without departing from the scope of the present invention. The at least one belt 1320 is adapted to attach yet detach pans or equipment being over or under the said belt 1320. The inverter system 300 generally comprises an upper moving portion 1310 and a lower moving portion 1312.

In typical usage of such an embodiment, the inverter system 1300 is adapted to receive an equipment through a conveyor adjacent to the bottom portion 1312. As the equipment approaches the belt 1320, the magnetic forces created by the magnetic belt 1320 make the equipment adhere to the magnetic belt 1320. The equipment is turned or inverted by the belt 1320 toward the upper portion 1310. The inverter system 1300 generally comprises an exit system 1200 connected to a conveyor. Broadly, the exit system 1200 returns the inverted equipment to the production line.

Referring now to FIGS. 9 to 12, different embodiments of drive 340 or idling wheels 340' are illustrated. The wheels 340 or 340' are generally shaped as a polygon or a rounded shape comprising flat sections 342 of teeth 344. In a preferred embodiment, each sprocket 340 is shaped as a decagon and each side of the decagon comprises five engaging sprocket teeth 344 forming the flat sections 342. Such flat section 342 generally aims at increasing the stability of the pans while being turned over. The flat sections 342 further aims at holding each pan to the magnetic belt 320 as the pans rotate around the sprocket 340' or 340. Each flat section 342 comprises teeth at each end of the section 342. Such teeth 346 are positioned closer to the teeth of the end of the next flat section 342 as a consequence of the polygonal shape.

The polygonal shape of the sprockets 340 or 340' and the configuration of the flat sections 342 may be adapted, resized and configured depending on the characteristics of the equipment to be cleaned or inverted, including without limitation the weight and dimensions of the equipment. Understandably, the sprocket wheels 340, 340' are not limited to a polygonal shape. Any other shapes comprising flat sections 342 of teeth 344 adapted to receive an equipment such as a pan may be used without departing from the scope of the present invention.

The sprocket typically comprises a hub or aperture 348 adapted to receive the driving or idling shaft 360 or 360'.

In a preferred embodiment, the drive and/or idler wheels 340, 340' are adapted to form a sectional flat surface 340 adapted to engage the rollers of the magnetic belt 320.

Figure 12:
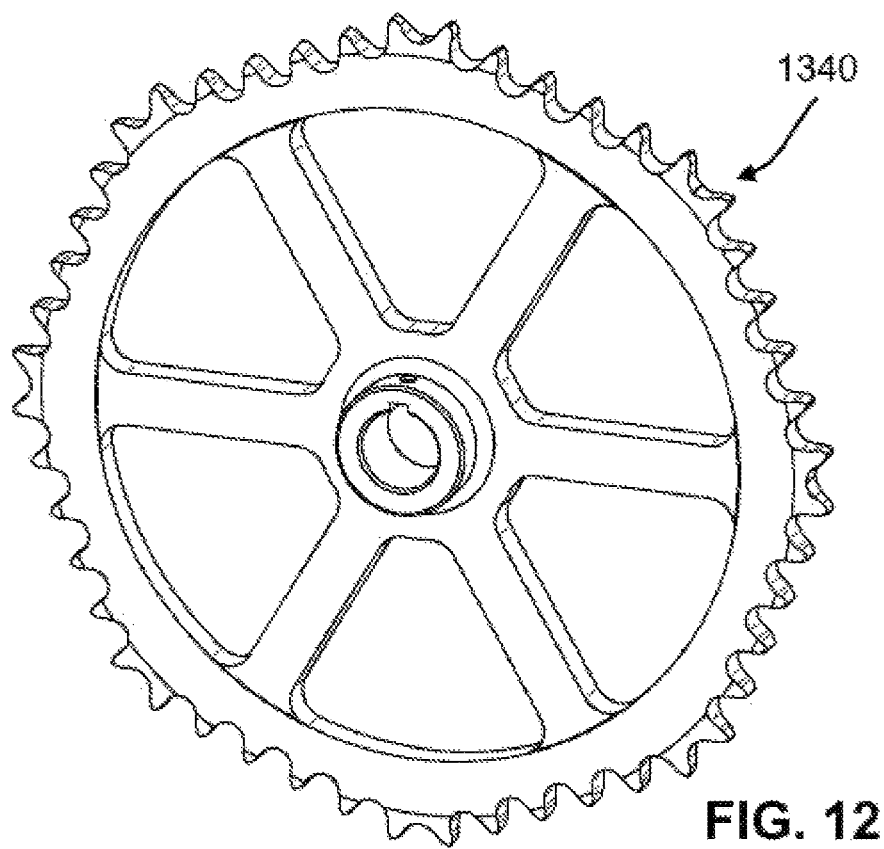
FIG. 12 is a plan view of another embodiment of a sprocket wheel used with an inverting system in accordance with the principles of the present invention.

Referring to FIG. 12, another embodiment of a sprocket 340 having eight (8) flat sections (shaped as an octagon) is shown. Such embodiment is typically used with single belt inverter systems 1000.

Figure 21:
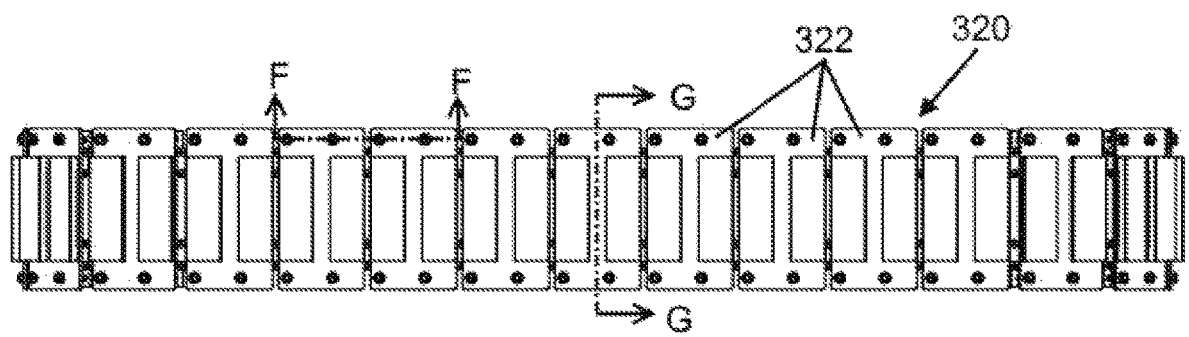
FIG. 21 is a top view of a magnetic conveyer belt of the supply inverting system in accordance with the principles of the present invention.
Figure 22:
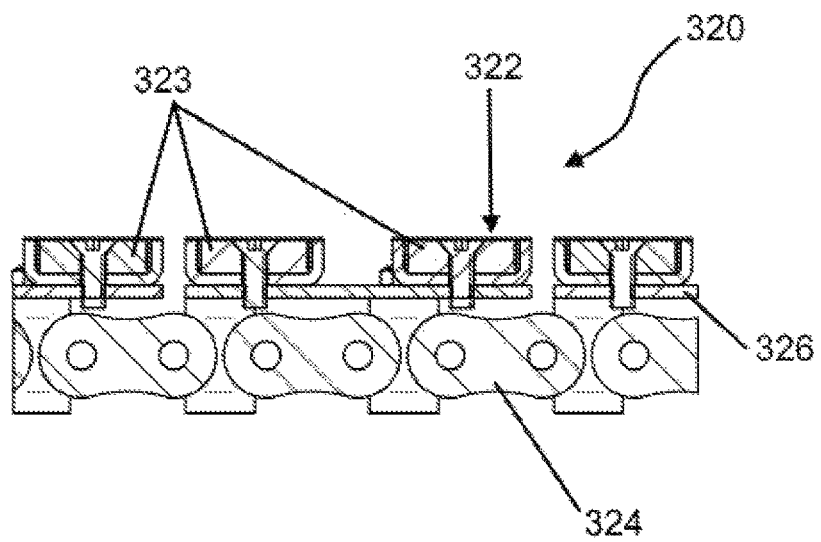
FIG. 22 is a sectional view along the axis F-F of the magnetic conveyer belt of FIG. 21.

Referring now to FIGS. 21 and 22, an exemplary endless belt 320 is illustrated. The belt 320 comprises a plurality of magnetic sections 322. Each section 322 comprises a top magnetic platform 326, preferably shaped as a rectangle. The top magnetic platform 326 may optionally comprise a top rubber strip 321. The magnetic platform 326 is configured to be rigidly attached from each side to at least one chain roller 324.

In a preferred embodiment, when the pan rotates around a sprocket 340, two magnetic adjacent sections 322 of the belt 320 provide magnetic forces to hold the pan attached or adhered to the magnetic belt 320. Understandably, in other embodiments and in used with different equipment to be cleaned, any number of adjacent magnetic sections received by a flat section 328 could be used without departing from the scope of the present invention.

Figure 23A:
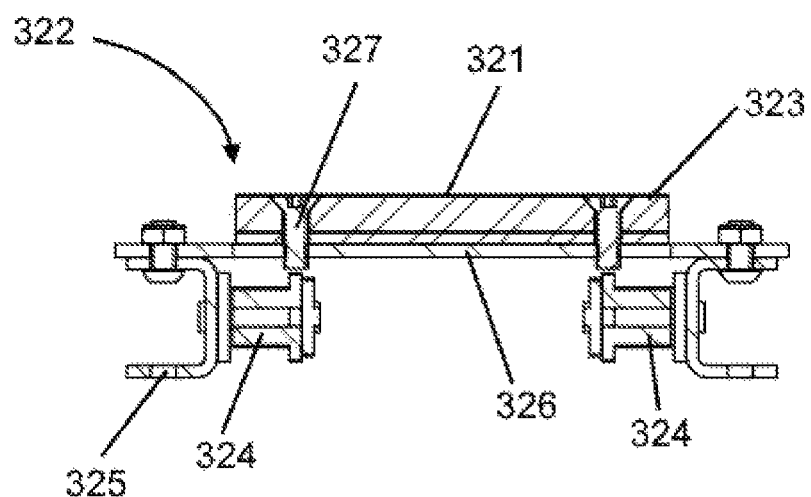
FIG. 23A is a sectional view along the axis G-G of the magnetic conveyer belt of FIG. 21.

Now referring to FIG. 23A, a sectional view of an embodiment of a magnetic section 322 is shown. The magnetic section 322 comprises a main plate 326 of non-magnetic material, such as stainless steel. The magnetic portion 323 is rigidly attached to the main plate 326. In some embodiments, the magnets may be made of permanent magnets, such as but not limited to neodymium N42.

The attachment may be made using any type of fasteners 327. The main plate 326 is further attached to two c-beams 325, each on each side. The said c-beams are then attached to or integral with one or more chain rollers 324. One skilled in the art shall understand that any method or mechanism may be used to attach the main plate 326 to the chain roller 324 without departing from the scope of the present invention.

Figure 23B:
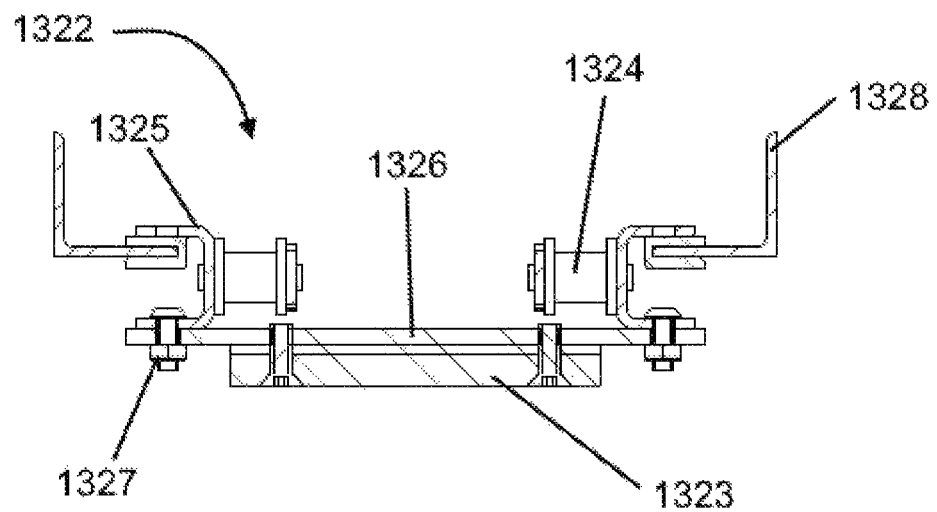
FIG. 23B is a sectional view along the axis G-G of another embodiment of the magnetic conveyer belt in accordance with the principles of the present invention.
Figure 24:
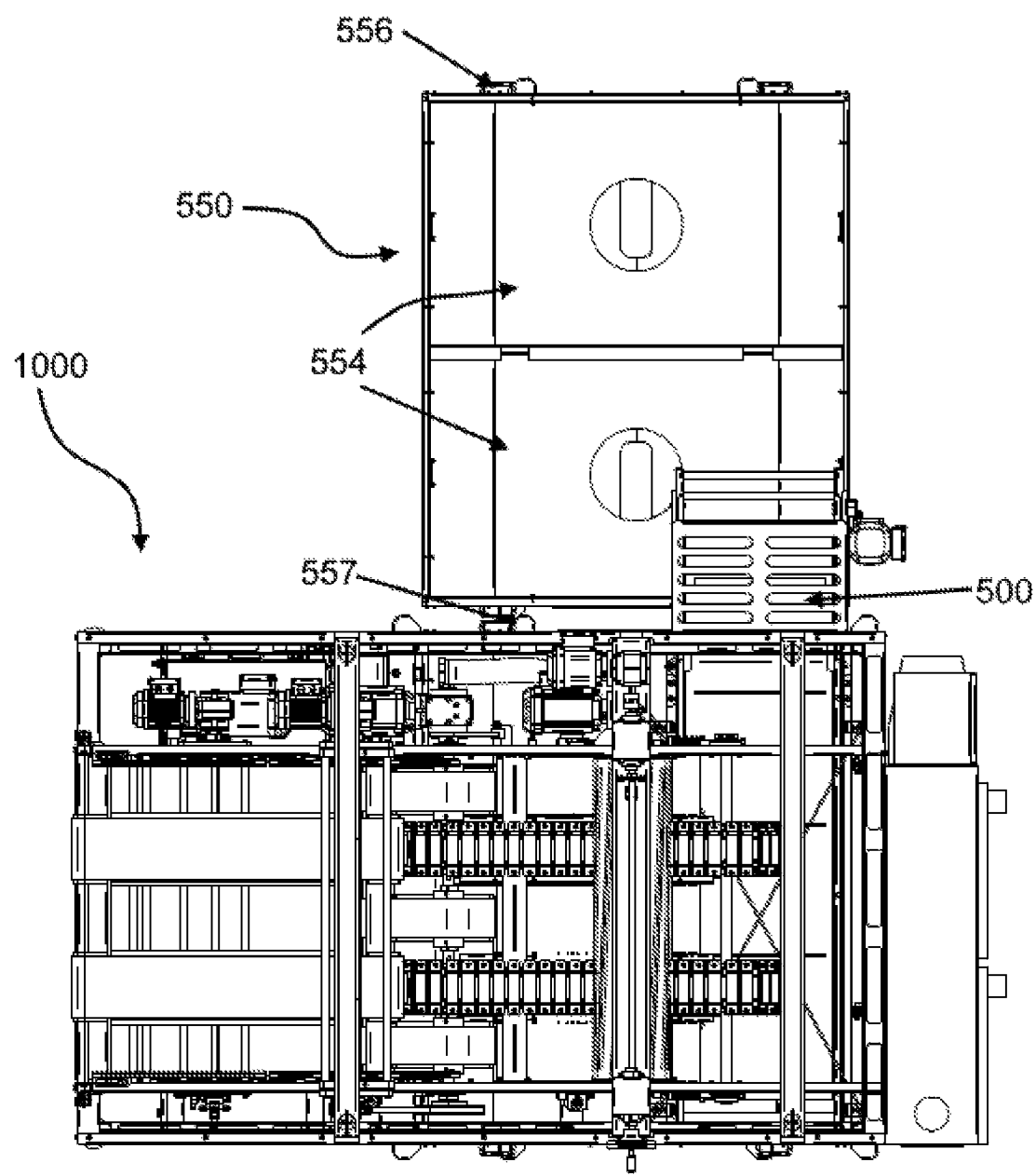
FIG. 24 is a top view of the conveyor of the inverting system of FIG. 6 comprising trash bins.

Now referring to FIG. 23B, a sectional view of another embodiment of a magnetic section 1322 is shown. The magnetic section 1322 comprises a main plate 1326 of non-magnetic material, such as stainless steel. The magnetic portion 1323 is rigidly attached to the main plate 1326. The attachment may be made using any type of fasteners 1327. The main plate 1326 is further attached to the bottom portion of two c-beams 1325, each on each side. The said c-beams 1325 may then be attached to one or more chain rollers 1324. Understandably, the c-beams-1326 could be integral with the chain rollers 1324. In such an embodiment, the c-beam 1325 may further comprise a L-shaped section 1328 adapted to guide or slide the belt 320 over or under a slider or guiding rail 380.

The inverter system 300 generally comprises an upper moving portion 310 and a lower moving portion 312. In a typical embodiment, the belt 320 forms the upper moving portion 310 and the lower moving portion 312. The inverter system 300 is adapted to move the adhered pans from the upper moving portion 310 to the lower moving portion 312 or vice versa. In one embodiment, the pans adhered to the inverter system 300 are cleaned by the at least one brush cleaning system 400 while being supported by the upper moving portion 310. The pans are turned upside down by the belt 320 when reaching the lower portion 312 (or vice versa). The content or at least some of the content of the upside-down pans falls down by means of gravity. The pans may further be cleaned by the at least one air cleaning mechanism 700 while being retained by the lower moving portion 312. The system 1000 further comprises a mechanism 600 to detach the moving pans from the lower portion of the inverter system 300.

Understandably, the pans may be cleaned through any other cleaning mechanism such as but not limited to air jets or pressurized water 400.

Figure 13:
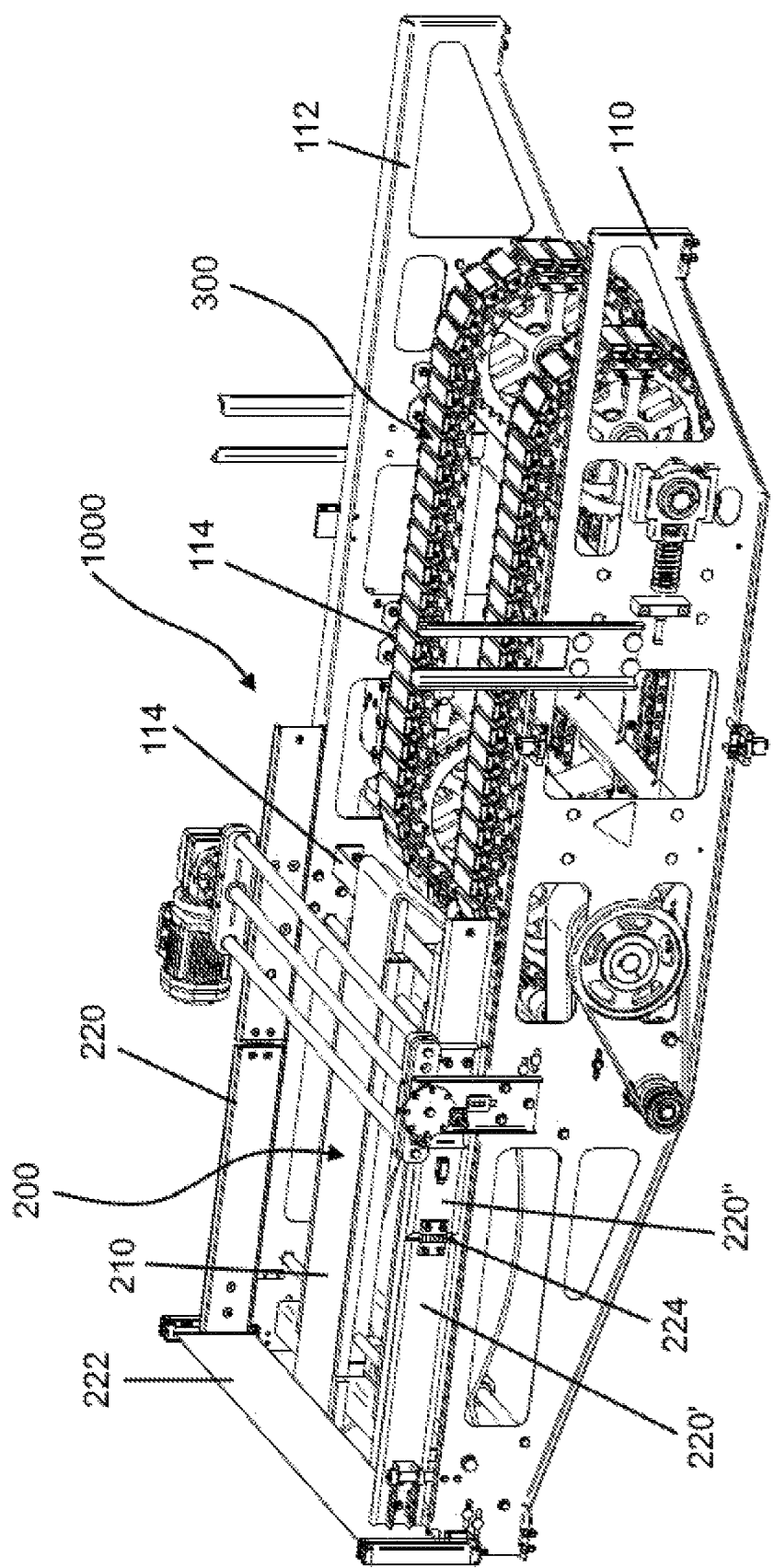
FIG. 13 is a top perspective view of a pan cleaner system comprising an inverter system and supply system in accordance with the principles of the present invention.
Figure 14:
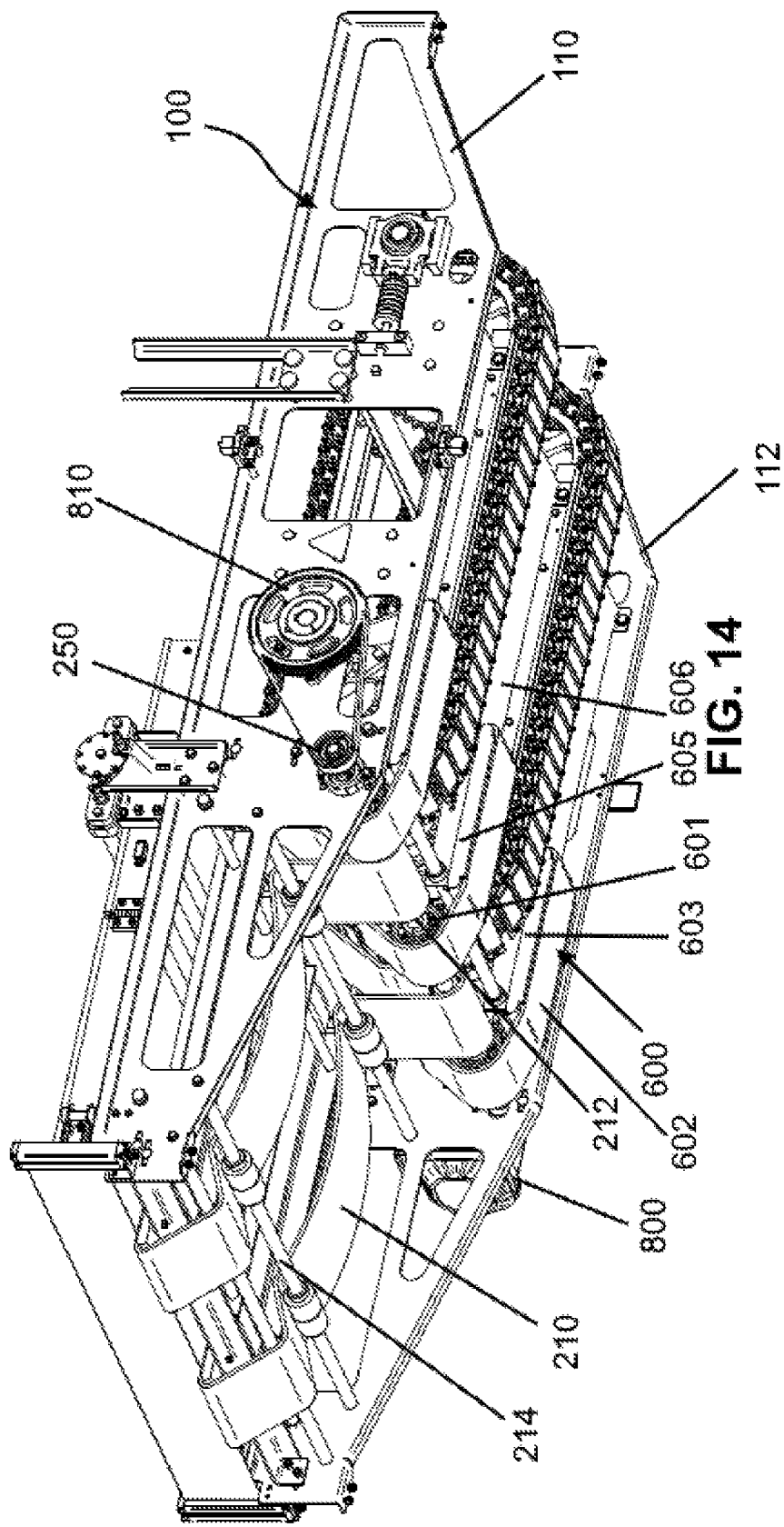
FIG. 14 is a bottom perspective view of the pan cleaner system of FIG. 13.

Referring now to FIGS. 13 and 14, an embodiment of the supply system 200 is shown. The supplying system 200 generally aims at directing and aligning the equipment or pan to be clean to the system 1000. In the present embodiment, the supply system comprises an endless belt 210 adapted to move the equipment toward the inverter system 300.

The supplying system 200 is typically powered and controlled by a motor 800. In the present embodiment, the same motor 800 drives the driving shaft 360 and the belt 210 by the mean of a gear or drive wheel 810 coupled to the driving shaft 212 of the supply belt 210. The rotation of the driving shaft 360 thus triggers the rotation of the drive shaft 212 of the belt 210. Understandably, any other mean of driving the belt 210 may be used.

In some embodiments, the sprocket 810 and the sprocket 250 may have different dimensions in order to control and to synchronize the rotational speed of the supply system 200 and the rotational speed of the inverting system 300. Such a speed control process aims to have a continuous, noninterrupted cleaning process independently of the number and the positions of the pans.

The supply system 200 may further comprises a detection system for validating or checking the height of the equipment to be cleaned 222. Such detection assembly 222 aims limiting the jamming of the system 1000. In some embodiments, the detection assembly 222 is attached to the frame 100. The detection assembly 222 is typically embodied as light curtains adapted to measure the height of the equipment to be cleaned. The system 1000 may be configured to receive the measurement data and to automatically stop the motor 800 when an object having not acceptable height crosses the detection assembly 222.

The supply system 200 may further comprise side guiding member 220. The guiding member 220 may be made of two sections 220' and 220". Each first section 220' of each side guiding member 220 is adapted to move away from the opposite first section 220' may be parallel or may form a general V shape. Each pair of second section 220" is adapted to be substantially parallel to each other. In another embodiment, the first section 220' may be connected to a second section 220" with one or more hinges 224, thus allowing the angle of the parallel or V shape to be changed to another desired configuration.

The supply system 200 and the inverting system 300 are configured to form a synchronized continuous functional line beginning by the supply system 200 receiving a pan to be cleaned and ending with the inverting system 300 releasing a cleaned pan. Such continuous line aims at reducing or eliminating accumulation of equipment waiting to be cleaned or eliminating synchronization system from the line of production, which tends to greatly simplify the layout of production.

Still referring to FIGS. 13 and 14, in an embodiment, the system 100 may comprise a main frame 100 comprises two side frames 110 and 112 connected altogether. The two side frames 110 and 112 are preferably connected using cross members 114. Understandably, any other type of main frame 100 known in the art allowing the pans to be supplied, cleaned, inverted and/or moved may be used without departing from the scope of the present invention.

Figure 15:
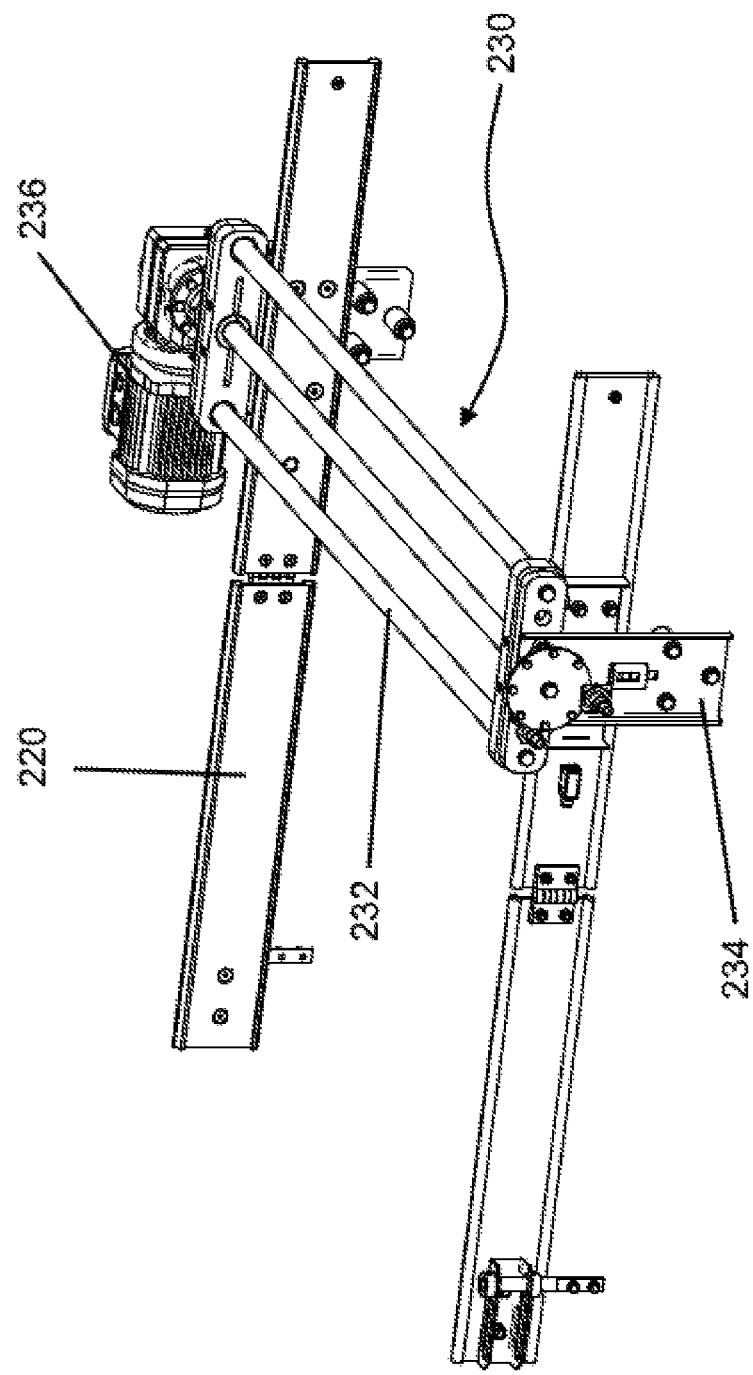
FIG. 15 is a top perspective view of a guide assembly structure of the supply system in accordance with the principles of the present invention.
Figure 18:
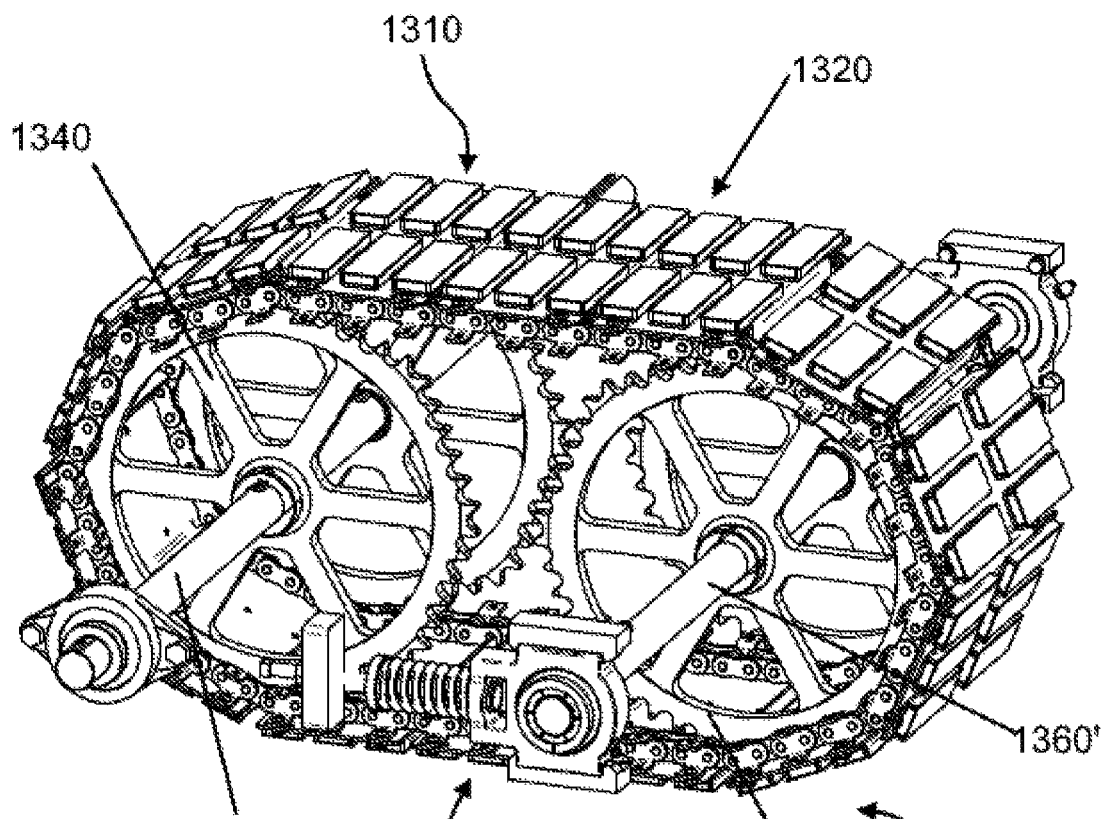
FIG. 18 is a top perspective view of a conveyor of another embodiment of an inverting system in accordance with the principles of the present invention.
Figure 19:
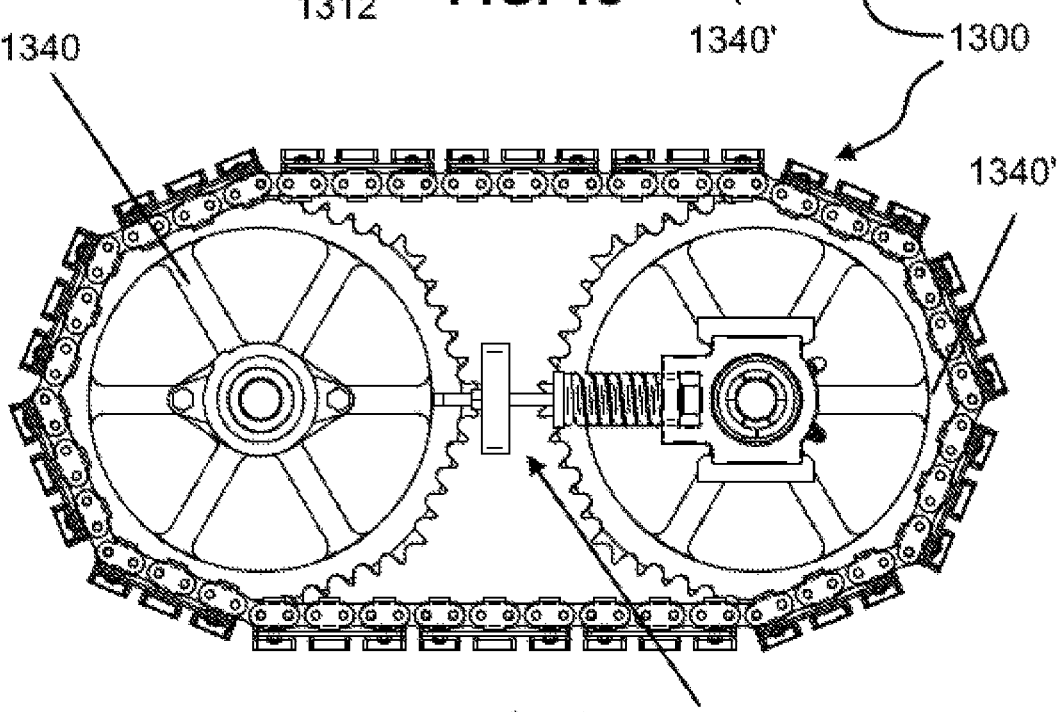
FIG. 19 is a side view of a conveyor of FIG. 18.
Figure 20A:
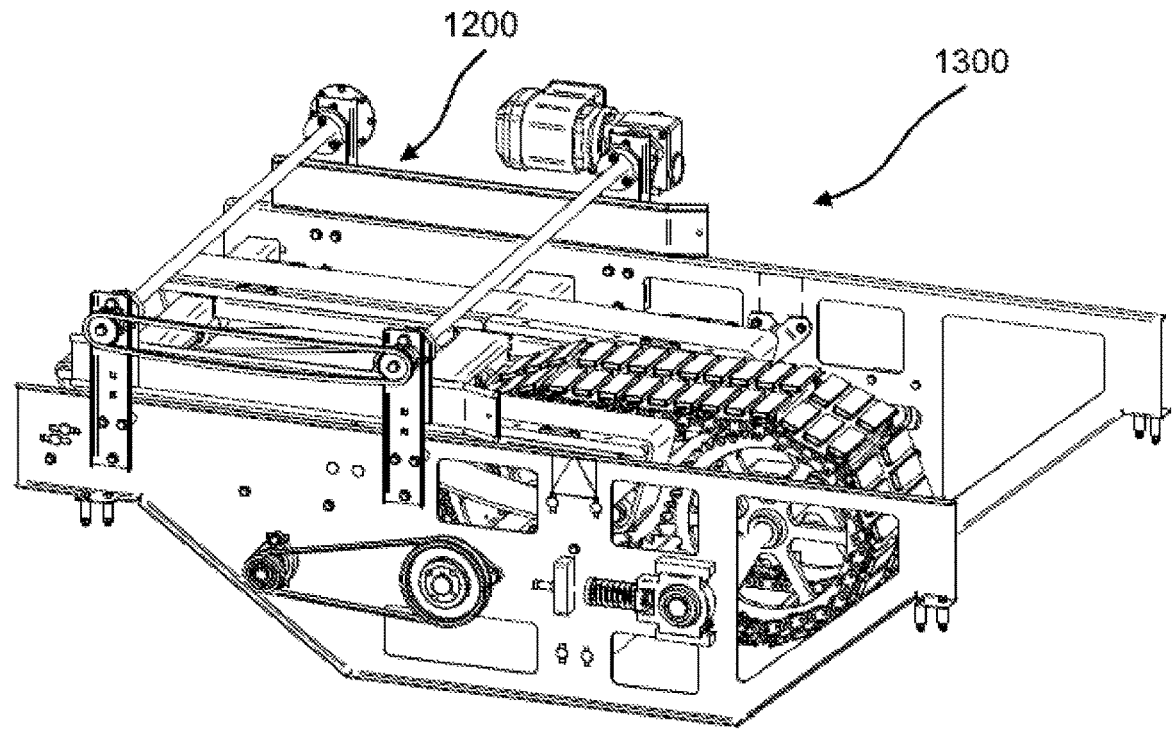
FIG. 20A is a top perspective view of a second embodiment of a pan inverter system comprising an inverter system and output or exit system in accordance with the principles of the present invention.
Figure 20B:
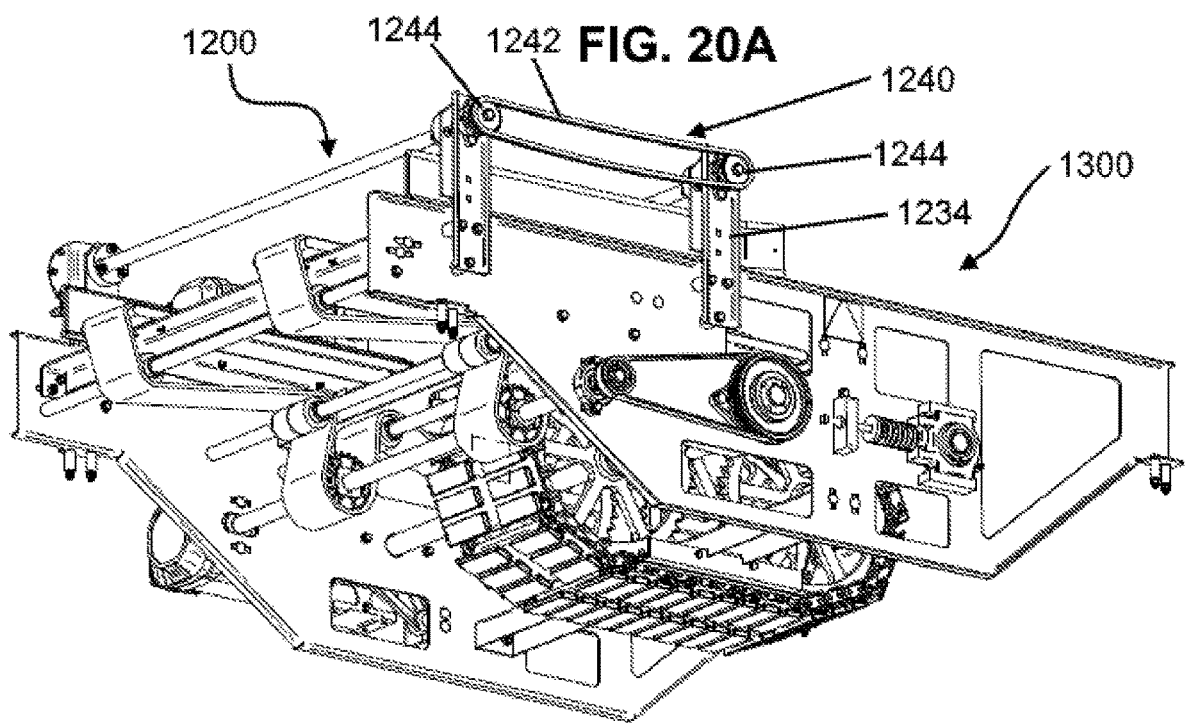
FIG. 20B is a bottom perspective view of the pan inverter system of FIG. 20.
Figure 20C:
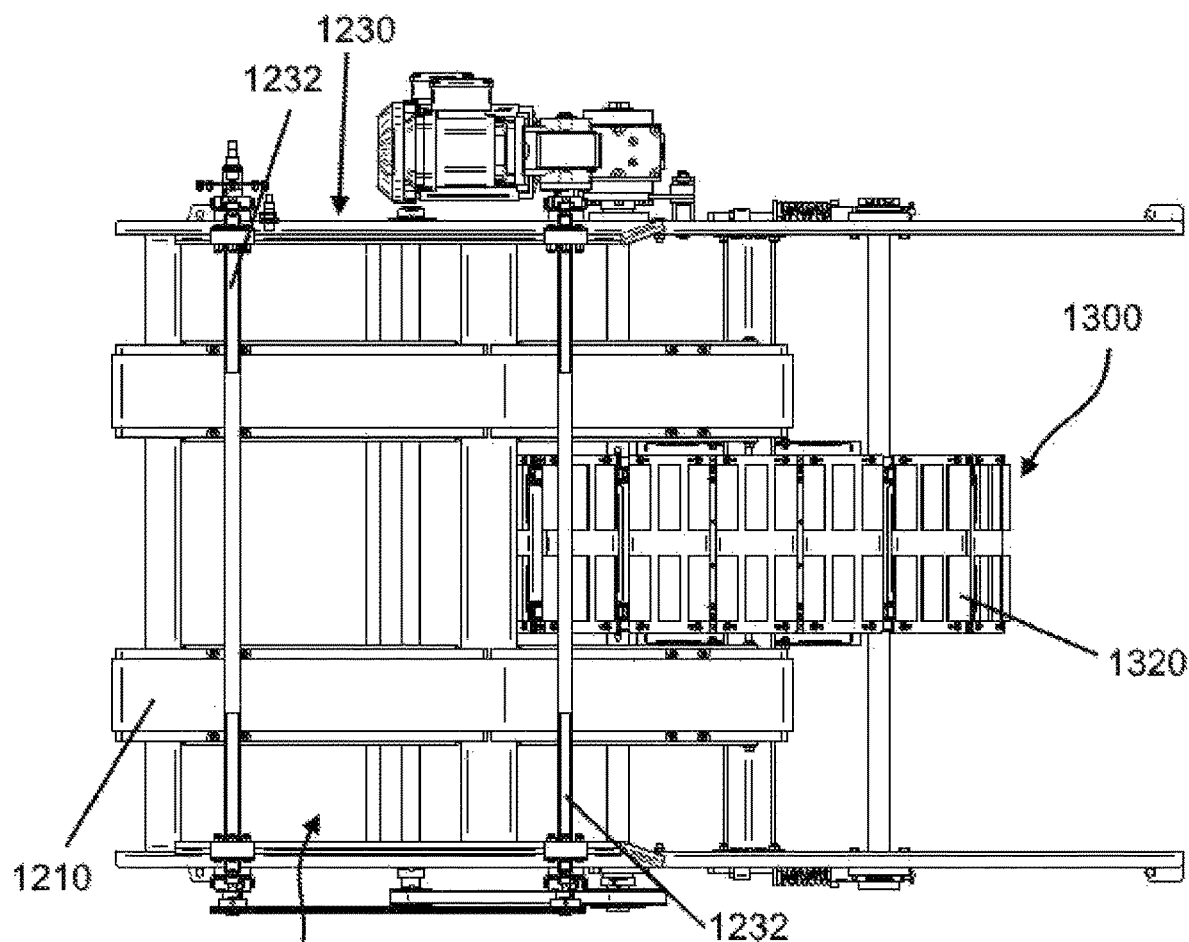
FIG. 20C is a top view of the pan inverter system of FIG. 20.
Figure 20D:
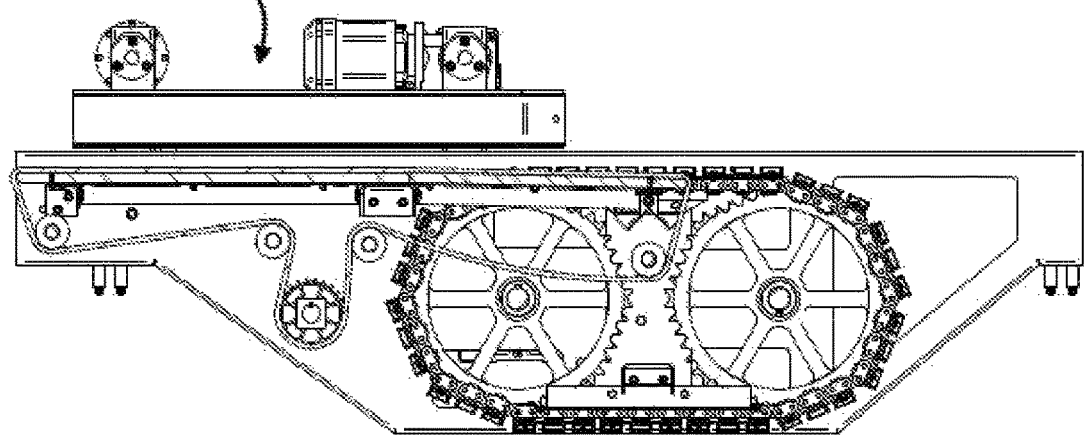
FIG. 20D is a side

Referring now to FIG. 15, a preferred embodiment of an adjustable guiding assembly 230 is illustrated. The adjustable guiding assembly 230 generally allow adapting the width of the supply system 200 to the width of the equipment to be cleaned. The exemplary guiding assembly 230 side guiding members 220 and adjusting rods 232. The adjustable guiding assembly 230 may be attached to the frame 100 using bracket 234 adapted to receive the support member 210 and to connect to the frame 100.

In some embodiments, at least one elongated member 232 is a worm screw driven by a motor 236, preferably a gear motor. As the worm screw is turned in a clockwise or anticlockwise direction, the width of the guiding assembly 230 is increased or reduced. The gear motor 236 may be attached to a support bracket 234. Understandably, any other known means to drive the elongated member 236 may be used without departing from the scope of the present invention.

Understandably, the adjustable guide assembly 230 aims at keeping the pans to be cleaned in the required orientation and/or to be received by the inverter system 300.

Understandably, any other type of guiding assembly 230 known in the art allowing the pans to be guided and directed from the supply system 200 towards the inverting system 300 may be used without departing from the scope of the present invention.

In a preferred embodiment, the support guides 220 may comprise sensors (not shown) capturing information such as the position of the pans, the number of pans per seconds or any other relevant information used to control the performance of the motors 800 or 236 and/or the operation of the guide assembly 230. Still referring to FIGS. 13 and 14, a preferred embodiment of a system 1000 comprising a supply system 200 and an inverting system 300 is illustrated. The supply system 200 generally receives pans to be cleaned and continuously guides pans towards the inverting system 300.

The supply system 200 may further comprise idling shafts or rollers 214. The drive shaft 212 and the idling shafts 214 are generally extending about the width of the main frame 100, preferably connecting both side frames 110 and 112. In a preferred embodiment, the belt 210 is driven by the drive shaft 212. In other embodiments, the belt 210 may be driven by or may drive other shafts, such as the idling shafts 214. In yet other embodiment, the supplying system 200 may comprises more than one belt 210 (as shown in FIGS. 13 and 14).

Understandably, any other type of supply system 200 known in the art allowing the pans to be supplied and moved towards the inverting system 300 may be used without departing from the scope of the present invention.

Now referring to FIGS. 20A to 20D, an embodiment of an output system 1200 is illustrated. In such an embodiment, the output system 1200 comprises more than one elongated member 1232. The output system 1200 typically comprises two belts 1210 each positioned on one side of the inverter system 200 or 1200. In a preferred embodiment, the belts 1210 overlap with the magnetic belt 1320 in order to detach the equipment from the magnetic belt 1320. In such an embodiment, the equipment or pans to be inverted are preferably attached to the bottom portion 1312 of the belt 1320 near the center of the width of the said equipment.

The guiding system 1230 generally aims at maintain the orientation and/or direction of the pans as they are detached from the belt 1320. The width of the guiding system 1230 may be adjustable. Such adjustment may be driven by a motor.

The guiding system may further comprise a power transmission system 1240. In a preferred embodiment, the power transmission system comprises a belt 1242 pivotally mounted on two sprockets 1244. The sprockets 1244 are pivotally mounted to the support brackets 1234. The belt 1242 may be embodied as a chain, a rubber band or any other belt type system. Among other benefits, the power transmission system aims at driving the idling elongated members 1210 and at synchronizing rotation speeds of the elongated members 1210.

The output system 1200 and the inverting system 1300 are configured to form a synchronized continuous functional line beginning by the inverting system 1300 receiving and inverting a pan and ending with the exit system 1200 releasing an inverted pan. Such continuous line aims at reducing or eliminating accumulation of equipment waiting to be cleaned or eliminating synchronization system from the line of production, which tends to greatly simplify the layout of production.

In a preferred embodiment the pan cleaning and inverting system 1000 forms a continuous production line with an inverting system comprising an exit system 1200 and an inverting system 1300.

Now referring back to FIGS. 2 to 4, the system 1000 may comprise a trash rejection system 500. The trash rejection system 500 is generally adapted to receive larger content from the inverted pan and to bring such content out of the system 1000. Indeed, in events where pans or equipment still carry large items, such items are caught by the trash rejection system 500 and exited out of the system 1000.

In a typical embodiment, the trash rejection system 500 comprises a conveyor system 510 having a belt 520 surrounding roller wheels 540 and a drive wheel 542 to move the content out of the system. In a preferred embodiment, the belt 520 surrounds a slide 522. The trash rejection system 500 allows limiting jamming situation in the system.

In yet other embodiments, the belt of the conveyor system 510 is made of a mesh or other open material allowing the smaller elements contained in the pan to pass through the trash rejection system 500. In such an embodiment, elements such as bread crumbs are received by a trash bin 550 positioned under the conveyor system 510.

Accordingly, now referring to FIGS. 2 and 24-25, 26A, 26B, 27A and 27B, the system 1000 may further comprise trash bins 550 to receive the content of the pans or the content moved by the trash rejection system 500. In some embodiment, the trash bin 550 is supported by wheels 552, such as swivel wheels and comprise at least one container 554. The trash bin 550 is adapted to fit within the housing of the system 1000. The trash bin 550 may further comprise foot or support elements 552 adapted to maintain the trash bin 550 in place in operation.

In some embodiments, the trash bin 550 further comprises a first connector 556 and a second connector 557 on each side. The first 556 and second 557 connector is compatible with the other connector as such that when a first side of the trash bin 550 comprising a first connector is pushed against the other side of an adjacent thrash bin 550 comprising a second connector, both trash bins are interlocked or connected together. Thus, in operation, when a container 554 of a trash bin is full, an operator may push an empty trash bin 550 against the trash bin 550 in use. Thus, the trash bin 550 may be replaced without impacting the operation of cleaning of the system 1000.

Figure 25:
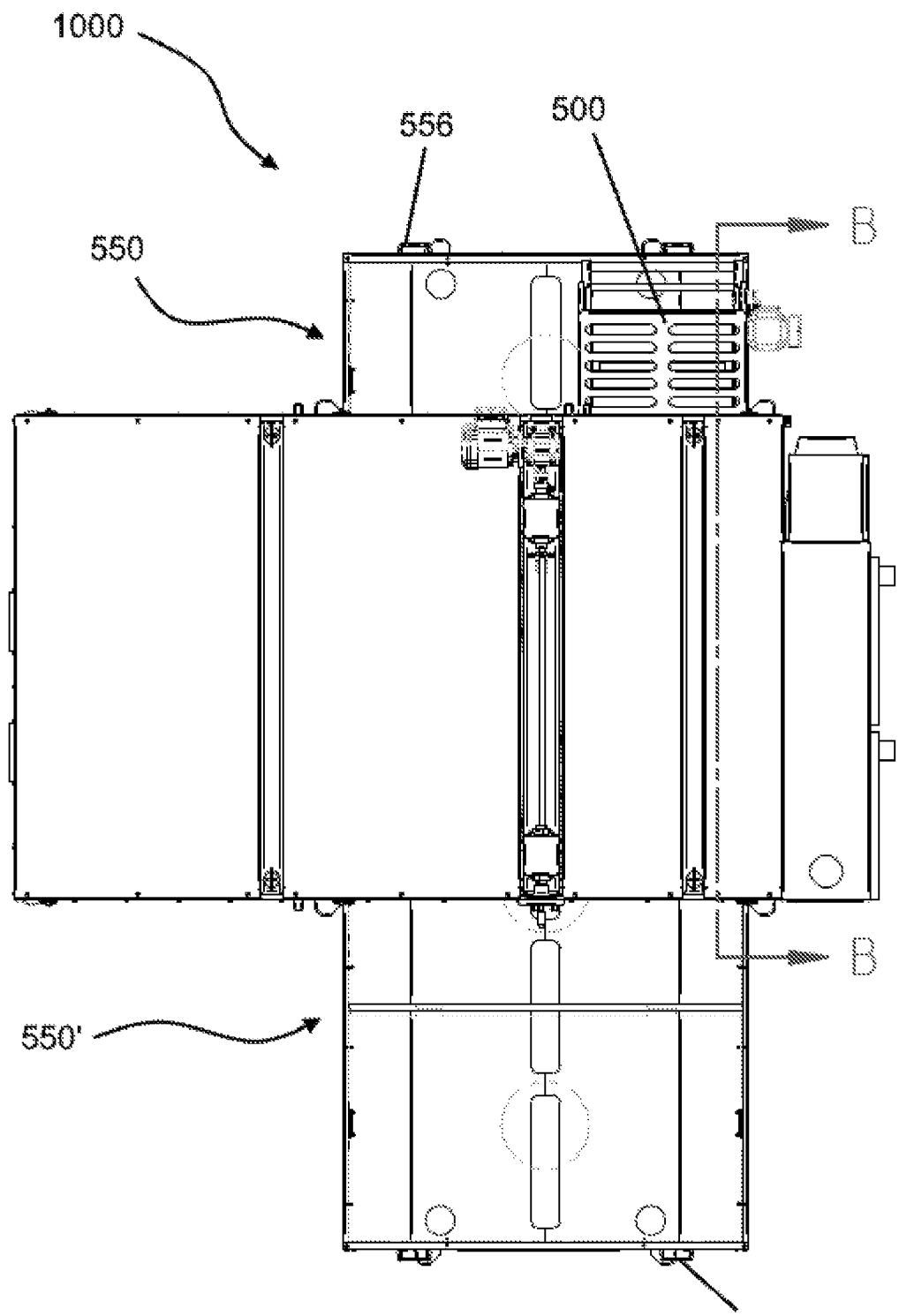
FIG. 25 is a top view of the inverting system of FIG. 24 shown with a trash bin being replaced.
Figure 26A:
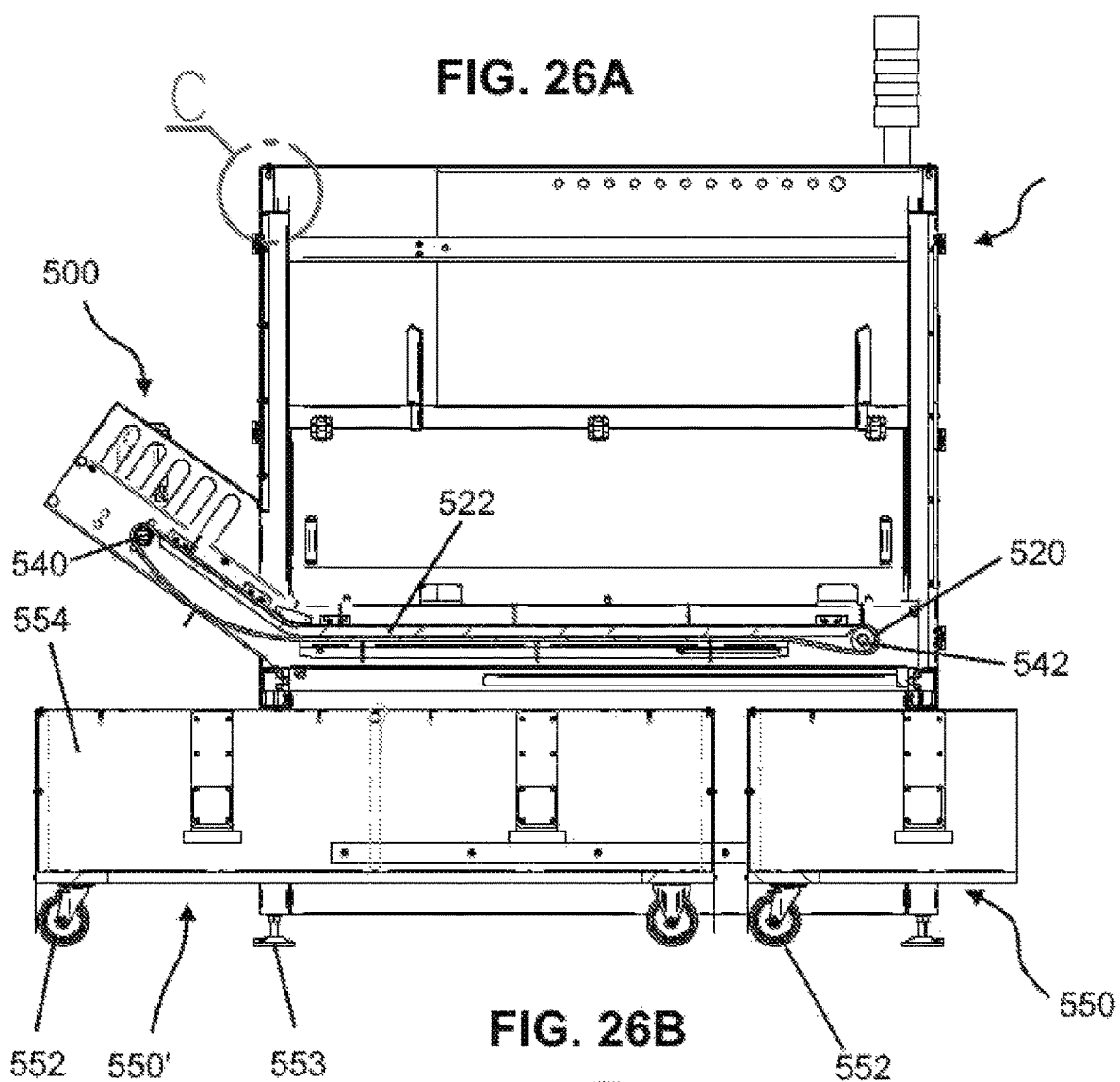
FIG. 26A is a side sectional view of the inverting system of FIG. 25 about the B-B axis.
Figure 26B:
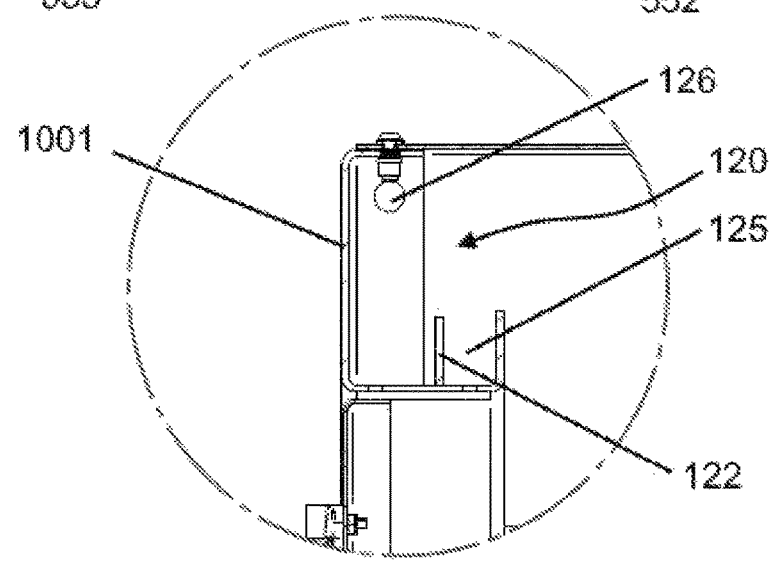
FIG. 26B is a close-up side view of the C area of FIG. 26A showing cables being fit in the frame of the system.

Referring now to FIGS. 25, 26A and 27A, an example of a trash bin 550 being replaced with another trash bin 550' during operation is illustrated. As shown, the other trash bin 550' is pushed against the trash bin 500 in use. As the other trash bin 550' moves under the trash conveyor 500, the in-use trash bin 500 exits from the system 1000. In some embodiments, the connectors 556 of the other trash bin 550' is received with the connector 557 of the in-use trash bin 550 to lock both trash bins together during replacement operations.

Referring now to FIGS. 26A-B and 27A-B, in some embodiments, the frame 1001 of the system 1000 or housing may comprise one or more hollow sections 120 allowing different cables to be passed through the frame 1001. Such sections 120 generally aim at hiding and/or separating cables needed by the different subsystems of the system 1000. The section 120 generally forms a passage area 124 for passing cables through the frame. Ins some embodiments, the section 120 further comprises an aperture 126 adapted to pass one or more cables. The section 120 may further comprise one or more separating elements 122 adapted to form sub-passages areas 125 for single or groups of cables. Understandably, any other shapes or hollow sections may be used to adapt to different configuration of the cables. Also, such hollow passages could be used in any other type of industrial machine or system in order to hide or store the cables within the frame of such machine or system.

The support frame 100 may further be attached to the transversal cross members 21 to generally define at least one top area 301 and at least one bottom area 302. The at least top and bottom areas 301 and 302 are preferably made of rigid material. The top and bottom areas 301 and 302 are generally adapted to support the belt in between the idler wheel 340 and drive wheel 340. In some embodiments, the drive wheel 340 and the idler wheel 340' are pivotally mounted to the support frame 100. In a preferred embodiment, the drive wheel 340 and idler wheel 340' are respectively mounted to the driving shaft 360 and to the idling shaft 360'. The driving shaft 360 and the idling shaft 360' are typically pivotally mounted to the support frame 100.

Still referring to FIGS. 13 to 17 and 27-28, the system 1000 further comprises at least one releasing system 600. The releasing system 600 is adapted to release or detach a clean pan or equipment from the belt 320. In a preferred embodiment, the releasing system 600 is adjacent to the inverter system 300. In the embodiment shown at FIGS. 13 and 14, the belt 320 is a magnetic belt and the releasing system 600 provides a structure at an angle α (see FIG. 16) to push the pans or equipment away from the magnetic belt 320. The releasing system 600 generally comprises a support structure 603, at least one driving wheel 601 and a belt 602 mounted around the support structure 603 and the driving wheel or sprocket 601. In a preferred embodiment, the drive wheel 601 is pivotally mounted to the driving shaft 312. Understandably, the driving wheel 601 could be pivotally mounted to any other section or structure without departing from the present invention.

The support structure 603 (see FIG. 14) may comprises a panel 606 and a release plate assembly 605. In the preferred embodiment, the release plate assembly 605 is installed at an angle α with regard to the magnetic belt 602 or at an angle α with respect to the horizontal surface defined by the panel 606. The horizontal surface is preferably coincident or at least parallel with the surface of the bottom rigid area 301. The release plate assembly 605 may further comprise a resilient member 604 allowing the release plate assembly 605 to be resiliently deformable.

In some embodiments, the system 1000 may comprise more than one releasing system 600. In such embodiments, the drive wheel 601 of each releasing systems 600 is attached to the same driving shaft 312, preferably powered by a motor.

Understandably, in embodiments where the rotation of the driving shaft 312 triggers the rotation of the wheel sprocket 601, the belt 602 slides over the outer surface of the drive wheel 601 and over the outer surface of the release plate assembly 605.

Referring back to FIG. 4, the system 1000 may further comprise an outfeed conveyor system 900. The outfeed conveyor system 900 is adapted to receive the equipment detached from the belt 320 by the releasing system 600. The outfeed conveyor system 900 typically comprises a belt 920 surrounding a plurality of wheels 910 powered by a motor. The outfeed conveyor system 900 may be moved up or down to adjust to the height of the equipment to be cleaned. The height adjustment generally aims at reducing the gap between the outfeed conveyor 900 and the releasing system 600 to limit damages to the equipment.

In other embodiments, the outfeed conveyor system 900 may be configured to receive the measurement data from the detection system 222 and to continuously control and/or adjust the height of the outfeed conveyor system 900 accordingly. In such an embodiment, the outfeed conveyor system 900 shall also receive or monitor the speed of the belt 320 to adjust height in time when the equipment is detached from the belt 320.

In yet other embodiments, the belt 320 may comprise means for attaching and detaching the pan or baking equipment, such as hooks, side arms or other retaining mechanism. In such embodiments, the releasing system 600 must comprise means for detaching the pan or baking equipment from the belt 320, such as a mechanism to unhook or remove retaining arms.

In some embodiments, the inverting system 300 may comprise more than one inverter system 300 and more than one releasing system 600. In yet another embodiment, the inverting systems 300 are mounted on the driving shaft 312 alternating with releasing systems 600.

In embodiments using a magnetic belt 320, the rotation of the driving shaft 312 triggers the rotation of the magnetic belt 320 of the inverting system 300, the rotation of the belt 602 of the releasing system 600 and the rotation of the belt 210 of the supply system 200. Understandably, any other means to respectively drive or power the rotation of the inverter system 300 and the releasing system 600 may be used, such as using a motor for each inverting system 300 and each releasing system 600.

In yet other embodiments, the wheel 601 and the driving wheel 340' may have different dimensions in order to provide different rotational speeds for the inverting system 300 and the releasing system 600.

In a preferred embodiment, the wheel sprocket 601 is being adapted to have a smaller diameter than the roller diameter of the driving sprocket 340' in order to provide a rotation speed to the releasing system 600 being higher than the rotation speed of the inverting system 300. Such a configuration facilitates the pans releasing operation.

In another embodiment, any type of inverting system 300 known in the art allowing the pans to be cleaned and moved may be used without departing from the scope of the present invention.

In a preferred embodiment, a brush cleaning system 400 is adapted to clean pans once being received in the top area 301 of the inverting system 300 and an air cleaning system 700 send an air stream in the pans being inverted (under the belt) (see FIG. 4). In one embodiment, a water or soap-based jet may be directed toward the inverted pans. The trash is then removed by a trash rejection system.

In yet other embodiments, any other type of releasing system 600 known in the art allowing the pans to be released from the belt 320 may be used without departing from the scope of the present invention.

Referring now to FIGS. 9-12, a method for fabricating or manufacturing the sprockets 340 and/or 340' is illustrated. The method comprises machining or shaping a polygonal sprocket plate or a rounded shape defining different flat sections 342 the flat sections 328 comprising the engaging sprocket teeth 340. The method may further comprise machining and rigidly attaching a hub 350 to the central section 348 of the machined sprocket.

Referring further to FIGS. 21-22, 23A and 23B, a preferred embodiment of a magnetic belt 320 is illustrated. The magnetic belt 320 as shown comprises a plurality of magnet sections or units 322. Each section 322 comprises a top magnetic platform 326, preferably shaped as a rectangle. The top magnetic platform 326 may further comprise a top rubber strip 321. The magnetic platform 326 is configured to be rigidly attached from each side to at least one chain roller 324, preferably using c-beam 325 and fasteners 327.

In a preferred embodiment, when the pan rotates around a sprocket 340, two magnetic sections 322 shall provide magnetic forces to hold the pan attached or adhered to the magnetic belt 320.

Referring now to FIGS. 1-29, a method for cleaning pans in a continuous production line is illustrated. The method comprises moving the pans towards a cleaning system to be cleaned. The moving of the pans may comprise activating a conveyor to move the pans. The method further comprises adhering or attaching the pans to a conveyor. The method further comprises inverting the pans while moving from an upper moving portion to an under moving portion of the conveyor. When turned upside down, such inversion allows the pan to release some of their content by gravity. The method may further comprise using any cleaning mechanism such as air jets or pressurized water to clean the pans. The method further comprises detaching the adhered or attached inverted pans from the conveyor.

In some embodiments, the method may further magnetically adhere the pan to the conveyor and physically separating the pan from the conveyor. The conveyor may magnetically adhere to the pan being inverted or being in an up-facing position. The method may further comprise magnetically holding the received pans by the magnetic belt 320 of the inverter system 300 in a way that the bottom of the received pans faces the magnetic belt 320.

The method may further comprise brushing the pan to remove content from the pan.

Once reaching the inverting system 300, the pans may be received by one or more sections of the magnetic belt 320, preferably engaging a first flat section of the driving or idling sprockets 340, 430'. The above-mentioned preferred polygonal configuration of the driving sprockets 340 generally aims at ensuring a first flat contact surface 328 with the bottom surface of the pans. Such flat surface generally aims at improving the stability of the pans while being transported and cleaned on the magnetic belt 320.

The method may further comprise cleaning the pan while being magnetically adhered to the conveyor and being moved by the conveyor.

The method may further comprise moving away the fallen remaining content of the equipment being inverted.

In yet other embodiments, the method may comprise adjusting the height of an outfeed conveyor to the height of the pan to be cleaned. The method may further comprise measuring the height of the pan to be cleaned and adjusting the height of the outfeed conveyor accordingly.

The method may also comprise adjusting the width of a guiding assembly for outputting or inputting pans from the conveyor.

Once again, the polygonal configuration of the driving sprockets 340 allows ensuring a flat contact surface 328 with the bottom surface of the pans which ensures the stability of the pans while being rotated upside down. Once sliding over the bottom rigid area 302 towards the first pair of the driving sprockets, the upside-down pans are being further cleaned by at least one of the cleaning systems 700 and/or 400. Further, the pans engage at least one releasing system 600 being horizontally angled with respect to the horizontal surface of the bottom rigid area 302. The releasing system 600 is adapted to disengage the pans from the magnetic belt 320. The pans being released upside-down from the inverting system 300 are then directed to be stored.

Understandably, the trash is typically removed from the machine by a trash rejection system.

Understandably, the method for cleaning pans defines a synchronized continuous functional process independently of the number of pans to be cleaned.

While illustrative and presently preferred embodiments of the invention have been described in detail hereinabove, it is to be understood that the inventive concepts may be otherwise variously embodied and employed and that the appended claims are intended to be construed to include such variations except insofar as limited by the prior art.

The invention claimed is:

1. An apparatus for cleaning equipment comprising a frame housing:
   a supply mechanism;
   an inverting system fixedly connected to the frame and operatively disposed after the supply mechanism in an operating configuration thereof for receiving the equipment from the supply mechanism in an upward direction and inverting the equipment in a downward position, the inverting system comprising:
      a drive mechanism;
      a mechanism driven by the drive mechanism to retain and invert the equipment to be cleaned in the downward position while the inverting system is remaining in the operating configuration; and
      a releasing system fixedly connected to the mechanism to retain and invert the equipment, the releasing system being adapted to detach the equipment from the inverting system when the equipment in the downward position is moved by the mechanism to retain and invert the equipment to the releasing system;
   wherein the mechanism to retain and invert the equipment, the releasing system and the supply system are configured to form a synchronized continuous functional line.

2. The apparatus of claim 1, wherein the mechanism to retain and invert the equipment further comprises:
   at least one drive wheel and at least one idling wheel; and
   an endless belt surrounding the at least one drive wheel and the at least one idling wheel, the endless belt comprising a plurality of sections adapted to adhere to the equipment and forming an upper portion and lower portion.

3. The apparatus of claim 2, wherein each section comprises a magnet and each equipment to be cleaned is made of magnetic material.

4. The apparatus of claim 2, wherein the endless belt conveyor belt is adapted to move the adhered equipment between the upper moving portion and the lower moving portion of the endless belt.

5. The apparatus of claim 1, wherein the apparatus for cleaning equipment further comprises an equipment cleaning system.

6. The apparatus of claim 5, wherein the cleaning system further comprises at least one of:
   i) an air cleaning system;
   ii) a water cleaning system; or
   iii) a brush cleaning system.

7. The apparatus of claim 2, the endless belt being a magnetic belt.

8. The apparatus of claim 7, wherein the magnetic belt comprises a plurality of magnets forming a series of sectional flat surfaces configured to move in correspondence with movements of the drive wheel and the idler wheel.

9. The apparatus of claim 7, the endless belt comprising a plurality of magnetic sections attached adjacent to one another and at least two chains drive, each of the plurality of the magnetic sections being attached to the at least two chains drive.

10. The apparatus of claim 9, each of the plurality of magnetic sections further comprising a magnet and a plate, the magnet being attached to the plate and the plate being attached to the at least two chains drive.

11. The apparatus of claim 1, wherein the inverting system comprises two endless magnetic drives operating in the synchronized continuous functional line.

12. The apparatus of claim 2, wherein the drive wheel and the idler wheel are sprocket wheels having a polygonal shape comprising a plurality of substantially flat sections, each flat section comprising a plurality of teeth.

13. The apparatus of claim 12, wherein the sprocket wheels comprises teeth disposed about a first radius and teeth disposed about a second radius.

14. The apparatus of claim 12, wherein each one of the sprockets is a decagon and each decagon side comprises five engaging sprocket teeth.

15. The apparatus of claim 1, wherein the apparatus further comprises a trash rejection system having a conveyor.

16. The apparatus of claim 1, wherein the apparatus further comprises a replaceable trash bin adapted to interlock with another trash bin and to be replaced during operation of the apparatus.

17. The apparatus of claim 12, wherein the inverting system further comprises a system allowing tension variation of the belt as a result of rotation of the sprocket wheels having a polygonal shape.

18. The apparatus of claim 1, wherein the apparatus further comprises a housing frame, the housing frame comprising hollow portions adapted to receive at least one cable.

19. A method for continuously inverting equipment, the method comprising:
   receiving the equipment to be cleaned as a continuous flow thereof;
   adhering the equipment to a conveyor belt comprising a consecutive sequence of magnetic planar portions driven by non-circular sprockets;
   inverting the conveyor belt while the equipment is adhered to the conveyor belt; and
   releasing the equipment from the conveyor belt while being inverted.

20. The method of claim 19, the method further comprising cleaning the equipment while the equipment is inverted and adhered on the conveyor belt.

21. The method of claim 20, the cleaning of the equipment further comprising at least one of the followings:
   cleaning the equipment with one or more air streams;
   cleaning the equipment with pressurized water; or
   brushing the equipment to be cleaned.

22. The method of claim 19, the adhering of the equipment to the conveyor belt further comprising magnetically attaching the equipment to the conveyor belt, wherein the equipment is made of magnetic material.

23. The method of claim 19, the method further comprising continuously moving out any trash content released from the inverted equipment.

* * * * *